US010632401B2

(12) United States Patent
Gehris

(10) Patent No.: US 10,632,401 B2
(45) Date of Patent: Apr. 28, 2020

(54) DIFFUSIOPHORETIC WATER FILTRATION DEVICE, MEMBRANE, OUTPUT SPLITTER AND INLET MANIFOLD AND RELATED METHODS

(71) Applicant: Split Rock Filter Systems LLC, New Paltz, NY (US)

(72) Inventor: William C. Gehris, New Paltz, NY (US)

(73) Assignee: Split Rock Filter Systems LLC, New Paltz, NY (US)

(*) Notice: Subject to any disclaimer, the term of this patent is extended or adjusted under 35 U.S.C. 154(b) by 0 days.

(21) Appl. No.: 16/283,716

(22) Filed: Feb. 22, 2019

(65) Prior Publication Data

US 2019/0193001 A1 Jun. 27, 2019

Related U.S. Application Data

(63) Continuation of application No. PCT/US2018/061146, filed on Nov. 14, 2018, which is a continuation of application No. 15/861,273, filed on Jan. 3, 2018, and a continuation of application No. 16/122,699, filed on Sep. 5, 2018, and a continuation of application No. 16/179,854, filed on Nov. 2, 2018, and a continuation of application No. 16/182,579, filed on Nov. 6, 2018, and a continuation of application No. 16/182,540, filed on Nov. 6, 2018.

(Continued)

(51) Int. Cl.
*B01D 63/08* (2006.01)
*B01D 69/06* (2006.01)

(Continued)

(52) U.S. Cl.
CPC ............ *B01D 24/30* (2013.01); *B01D 39/02* (2013.01); *B01D 65/025* (2013.01); *B01D 69/02* (2013.01);

(Continued)

(58) Field of Classification Search
CPC ........ B01D 24/30; B01D 71/70; B01D 39/02; B01D 69/02; B01D 65/02;

(Continued)

(56) References Cited

U.S. PATENT DOCUMENTS 5,496,472 A 3/1996 Slack et al.
6,908,547 B2 6/2005 Cote et al.

(Continued)

FOREIGN PATENT DOCUMENTS

CA 2909003 A1 4/2017
CN 103807457 5/2014

(Continued)

OTHER PUBLICATIONS

Lee et al., Synthesis and Properties of Waterborne Poly(urethane urea)s Containing Polydimethylsiloxane, Journal of Applied Polymer Science, vol. 120, 212-219 (2011). (Year: 2011).*

(Continued)

*Primary Examiner* — Pranav N Patel

(57) ABSTRACT

A water filtration device comprising: a diffusiophoretic water filter having at least one channel having an inlet and an outlet and for receiving a colloidal suspension at the inlet and flowing the colloidal suspension between the inlet and the outlet in a flow direction, the channel being in contact with a diffusiophoretic-inducing membrane. Other devices and methods are also disclosed.

18 Claims, 17 Drawing Sheets

Related U.S. Application Data

(60) Provisional application No. 62/587,510, filed on Nov. 17, 2017.

(51) Int. Cl.

*B01D 71/70* (2006.01)
*B01J 8/00* (2006.01)
*B01D 24/30* (2006.01)
*B01D 39/02* (2006.01)
*B01D 65/02* (2006.01)
*B01D 69/02* (2006.01)
*C02F 1/00* (2006.01)
*C02F 103/00* (2006.01)

(52) U.S. Cl.

CPC .............. *B01D 71/70* (2013.01); *B01J 8/005* (2013.01); *C02F 1/001* (2013.01); *B01D 2239/1241* (2013.01); *C02F 1/005* (2013.01); *C02F 2103/007* (2013.01)

(58) Field of Classification Search

CPC ............ B01D 63/08–088; B01D 57/02; B01D 47/02; B01D 2259/12; B01J 8/00

See application file for complete search history.

(56) References Cited

U.S. PATENT DOCUMENTS

2003/0121841 A1 7/2003 Harttig et al.
2004/0258571 A1* 12/2004 Lee ........................ B01D 61/08 436/86
2007/0138082 A1* 6/2007 Connors, Jr. ........ B01D 63/082 210/321.84
2009/0145831 A1* 6/2009 Manabe ............... B01D 63/082 210/232
2011/0290113 A1* 12/2011 Borenstein .......... A61M 1/1698 95/54
2012/0160096 A1* 6/2012 Gottlieb ............. B01D 19/0031 95/46
2015/0353376 A1 12/2015 Hanover
2016/0375407 A1 12/2016 Velegol
2018/0257054 A1 9/2018 Shardt et al.

FOREIGN PATENT DOCUMENTS

WO WO 2015/077674 A1 5/2015
WO WO2018048735 A1 3/2018

OTHER PUBLICATIONS

M.J. Owen, Elastomers: Siloxane, Encyclopedia of Materials: Science and Technology, Elsevier, 2001, pp. 2480-2482. (Year: 2001).*

“Reverse Osmosis Pretreatment,” downloaded on Jan. 14, 2018 from https://www.lenntech.com/ro/ro-pretreatment.htm, Jan. 4, 2008.

“Ultrafiltration” downloaded on Jan. 14, 2018 from https://www.lenntech.com/library/ultrafiltration/ultrafiltration.htm, Mar. 11, 2008.

Isaias:“Experience in reverse osmosis pretreatment,” Desalination 139 (2001), 57-64, received Feb. 2, 2001.

Brunelle et al:“Colloidal Fouling of Reverse Osmosis Membranes,” Desalination 32 (1980) 127-135, Jan. 1980.

“Membraneless water filtration using CO2” by Shin et al. (Nature Communications 8:15181), May 2, 2017.

“Diffusiophoresis at the macroscale” by Mauger et al. (arXiv: 1512.05005v4), Jul. 6, 2016.

“Origins of concentration gradients for diffusiophoresis” by Velegol et al, (10.1039/c6sm00052e), pp. 4686 to 4703, May 13, 2016.

International Search Report of PCT/US2018/061146, dated Feb. 11, 2019.

International Search Opinion of PCT/US2018/061146, dated Feb. 11, 2019.

* cited by examiner

DIFFUSIOPHORETIC WATER FILTRATION DEVICE, MEMBRANE, OUTPUT SPLITTER AND INLET MANIFOLD AND RELATED METHODS

This is a Continuation of International Patent Application PCT/US18/61146, filed Nov. 14, 2018 which claims the benefit of U.S. Provisional Patent Application 62/587,510, filed Nov. 17, 2017, of U.S. patent application Ser. No. 15/861,273, filed Jan. 3, 2018, of U.S. patent application Ser. No. 16/122,699, filed Sep. 5, 2018, of U.S. patent application Ser. No. 16/179,854, filed Nov. 2, 2018, of U.S. patent application Ser. No. 16/182,540, filed Nov. 6, 2018, and of U.S. patent application Ser. No. 16/182,579, filed Nov. 6, 2018. All of the applications noted in this paragraph are hereby incorporated by reference herein, in their entirety.

This application relates generally to water filtration and more particularly to diffusiophoretic water filtration.

BACKGROUND

WO 2018/048735 A1 discloses a device operative in separating particles in a flowing suspension of the particles in a liquid which device comprises: a first, pressurized cavity or plenum adapted to contain a gas, separated by a first gas permeable wall from a second cavity or plenum which contains a charged particle containing liquid which also contains an ion species formed by the dissolution of the gas within the liquid, which is in turn separated by a second permeable wall from the ambient atmosphere or an optional, third, relatively reduced pressure cavity or plenum which may contain a gas or a vacuum; wherein: the permeable walls operate to permit for the transfer of a gas from the first cavity through the second cavity and through the second permeable wall to the atmosphere or a third cavity and, the pressure present in atmosphere or the third cavity is lesser than that of the first cavity, thus forming an ion concentration differential within the liquid and between the permeable walls.

The related article "Membraneless water filtration using CO2" by Shin et al. (Nature Communications 8:15181), 2 May 2017, describes a continuous flow particle filtration device in which a colloidal suspension flows through a straight channel in a gas permeable material made of polydimethylsiloxane (PDMS). A CO2 (carbon dioxide) gas channel passes parallel to the wall and dissolves into the flow stream. An air channel on the other side of the wall prevents saturation of CO2 in the suspension and the resulting gradient of CO2 causes particles to concentrate on sides of the channel, with negatively charged particles moving toward the air channel and positively charged particles toward the CO2 channel. The water away from the sides of the channel can be collected as filtered water.

The article "Diffusiophoresis at the macroscale" by Mauger et al. (arXiv: 1512.05005v4), 6 Jul. 2016, discloses that solute concentration gradients caused by salts such as LiCl impact colloidal transport at lengthscales ranging roughly from the centimeter down to the smallest scales resolved by the article. Colloids of a diameter of 200 nm were examined.

The article "Origins of concentration gradients for diffusiophoresis" by Velegol et al, (10.1039/c6sm00052e), 13 May 2016, describes diffusiophoresis possibly occurring in georeservoir extractions, physiological systems, drying operations, laboratory and industrial separations, crystallization operations, membrane processes, and many other situations, often without being recognized.

PCT Publication WO 2015/077674 A1 discloses a process that places a microparticle including a salt in proximity to a membrane such that the microparticle creates a gradient generated spontaneous electric field or a gradient generated spontaneous chemiphoretic field in the solvent proximal to the membrane. This gradient actively draws charged particles, via diffusiophoresis, away from the membrane thereby removing charged particulate matter away from the membrane or preventing its deposition.

SUMMARY OF THE INVENTION

The present invention provides a water filtration device comprising a diffusiophoretic water filter having at least one channel having an inlet and an outlet and for receiving a colloidal suspension at the inlet and flowing the colloidal suspension between the inlet and the outlet in a flow direction, the channel being in contact with a diffusiophoretic-inducing membrane.

The present invention may contain one or more of the following additional features, alone or in combination with other features:

a pressurizable gas chamber for providing pressurized gas to the at least one channel via the membrane, the membrane being a gas permeable and water impermeable membrane;

an inlet manifold for receiving the colloidal suspension including colloidal particles in water;

the inlet manifold including an integral extension of the membrane;

the inlet manifold including a water pressure regulator;

the water pressure regulator having a height regulator;

the inlet manifold including a broad-crested weir;

an outlet splitter for connecting to the outlet, the outlet splitter having a first splitter outlet and a second splitter outlet, the first splitter outlet for receiving water having a higher concentration of some of the colloidal particles than a second splitter outlet;

the outlet splitter being removable;

the outlet splitter having a movable splitter device for altering size of the first splitter outlet;

the outlet splitter having three outlets and two splitter devices;

the outlet splitter being replaceable by different sized outlet splitters;

the channel being an open channel;

the channel being an openable channel;

a removable and reassemblable cover defining a boundary of the diffusiophoretic flow chamber;

a plurality of channels in contact with the membrane;

the membrane being unstructured;

the membrane having a slope of at least 0.001 m/m, and the channel being an open channel;

a structured cover interacting with the membrane to define a plurality of channels;

a removable channel structure placed on the membrane;

the membrane being at least 5 cm, preferably at least 10 cm, and in some applications at least a meter in width;

the membrane being at least 10 micrometers in thickness, preferably 10 micrometers to 250 micrometers, and most preferably from 20 micrometers to 100 micrometers.

the membrane being at least 5 cm in length, preferably at least 10 cm, preferably at least 50 cm, and more preferable at least 1 m and in some applications at least 50 m;

the membrane being horizontal;

the membrane being a PDMS sheet;

the sheet having a Shore A of between 40 and 60, a tensile elongation of at least 1000 psi, an elongation to failure at least 200%, preferably at least 400%, and/or the tear B being at least 150 ppi;

the sheet stretched taut at least in a width direction;

the cover made in one piece together with a channel structure of longitudinally extending microchannels, each for example of a thickness of 500 micrometers, width of 900 micrometers and extending a meter in length;

the cover and channel structure etched for example via soft lithography into a single piece of PDMS material;

a PDMS barrier between the channels in the width direction of 100 micrometers can be provided, and 1000 or more microchannels provided;

a single piece 1 m×1 m cover and channel structure laid over the PDMS sheet;

a top of the channel structure being for example 10 to 25 micrometers;

the channel structure provided separately from the cover, and is sandwiched by the sheet and the cover;

the channel structure at least 100 micrometers, preferably at least 250, and in some applications at least 500 micrometers thick;

the channel structure having holes at least 500 micrometers wide and extending at least 50 cm, preferably at least a meter in length;

a colloidal suspension supply over a front end of the holes;

a rear end of the channel structure having an outlet structure to divide the outlet stream;

the separate channel structure also removable from a bottom sheet and the cover;

at least one longitudinally extending clamp so that the cover is clamped with respect to the sheet;

a flange on a gas chamber as a counter surface for the clamp;

a weight for placement on the cover;

the weight being gas permeable;

the weight having a honeycomb structure;

the weight forming part of a clamp for the cover;

at least one longitudinally extending clamp so that the membrane is clamped;

the channels having 20 micrometer thickness or less;

a pressurized gas, preferably carbon dioxide, preferably pressurized to at least 120 kPa and most preferably to at least 130 kPa, preferably between 130 kPa and 200 kPa, contacting the membrane;

the first outlet size alterable as a function of the particles in the water exiting through the at least one outlet, for example an efficiency of the filtration; and/or the water filter upstream and/or downstream of a sand filter.

The present invention also provides a diffusiophoretic membrane for imparting diffusiophoresis on a colloidal suspension, the membrane being unstructured and being at least 5 cm by 5 cm. The membrane may have any or all of the membrane characteristics described above.

The present invention also provides an inlet manifold connectable and at least partially removable with respect to the diffusiophoretic water filter. The inlet manifold may have any or all of the inlet manifold characteristics described above.

The present invention also provides a removable or movable outlet splitter. The outlet splitter may have any or all of the inlet manifold characteristics described above.

The present invention also provides a method for operating a water filtration device comprising a diffusiophoretic water filter having at least one channel having an inlet and an outlet and for receiving a colloidal suspension at the inlet and flowing the colloidal suspension between the inlet and the outlet in a flow direction, the channel being in contact with a diffusiophoretic-inducing membrane.

The method may include one or more of the following additional features, alone or in combination with other features:

providing one of more of the structural featured listed above;

providing a pressurized gas to the membrane;

the gas being carbon-dioxide, preferably pressurized to at least 120 kPa and most preferably to at least 130 kPa, preferably between 130 kPa and 200 kPa, contacting the membrane;

altering a slope of the membrane;

flowing the colloidal suspension in a laminar state, most preferably with a Reynolds number less than 2000, and even more preferably less than 200;

a flow velocity being at least 0.05 meters per second, filtering PFOAs, bacteria, viruses; and/or other charged particles;

filtering negatively charged particles;

filtering positively charged particles;

filtering noncolloidal particles;

spraying the membrane with water;

removing a cover to open the diffusiophoretic filter;

flowing the colloidal suspension in an open channel state;

aiding sedimentation of particles in the water using the device.

The present invention also provides methods for assembling a water filtration device, such as sealing an inlet manifold with a height pressure regulator to a diffusiophoretic water filter, attaching a removable outlet to a diffusiophoretic water filter, removably attaching a membrane to a pressurizable gas chamber, and/or placing a weighted structure on the water filter.

The present invention also provides a method of cleaning of the water filter by separating at least part of the inlet manifold from the opening of the water filter and spraying the membrane and channels with clean water. The present invention also provides a method of transporting a water filtration device by removing at least part of the inlet manifold from the diffusiophoretic water filter and transporting the inlet manifold and the diffusiophoretic water filter separately.

The present invention also provides a method of transporting a water filtration device by removing a membrane of the diffusiophoretic water filter from a pressurizable gas chamber and transporting the inlet manifold and the diffusiophoretic water filter separately.

The present invention also advantageously can provide a testing device for testing water for use in designing a larger diffusiophoretic water filter. Since wider membranes and a single pressurizable gas plenum are easily constructed, the performance of the water filter on certain particles such as PFOAs can be first measured with the testing device and then larger scale commercial diffusiophoretic water filtration devices according to, for example, a municipality's need, constructed.

While the present application claims specific structures and methods, other inventive concepts that may be broader than the present claims, such as a diffusiophoretic water filtration device with a flow chamber separable into at least parts, to provide for easy cleaning, a diffusiophoretic water filtration device with a clamped flow chamber, and a diffusiophoretic water filtration device with a variable outlet, a diffusiophoretic water filtration device for filtering noncolloidal particles of larger sizes as well as methods for constructing, operating and cleaning a diffusiophoretic water filtration device, are contained herein. Moreover, several features claimed, including the horizontal orientation of the device, type of gas, and thickness of the flow chamber, are advantageous, but may not be necessary to a broader inventive concept.

BRIEF DESCRIPTION OF THE DRAWINGS

One schematic embodiment of the water filtration system of the present invention is shown by reference to FIGS. 1 to 8, in which.

Figure 9:
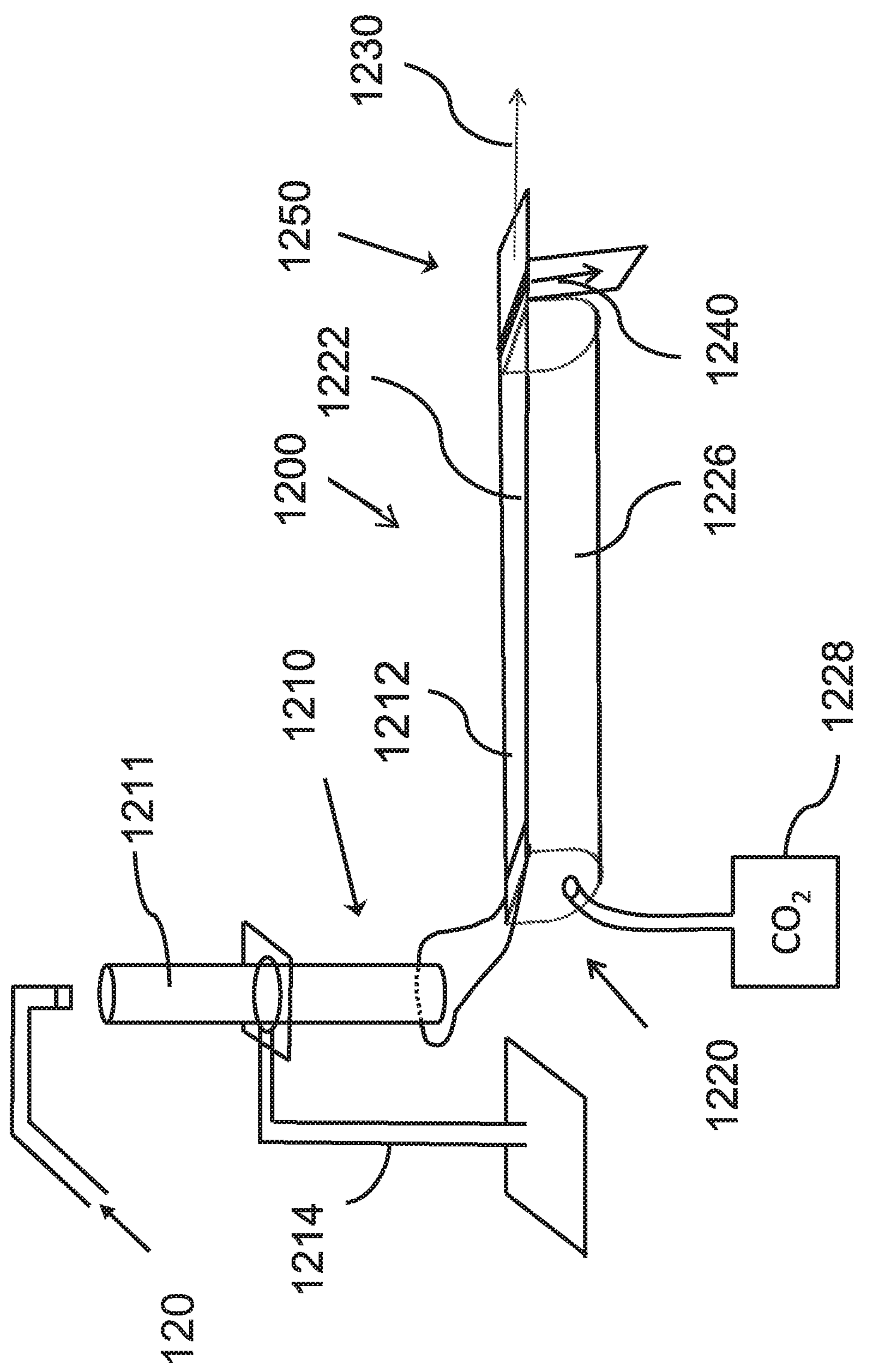
Figure 10:
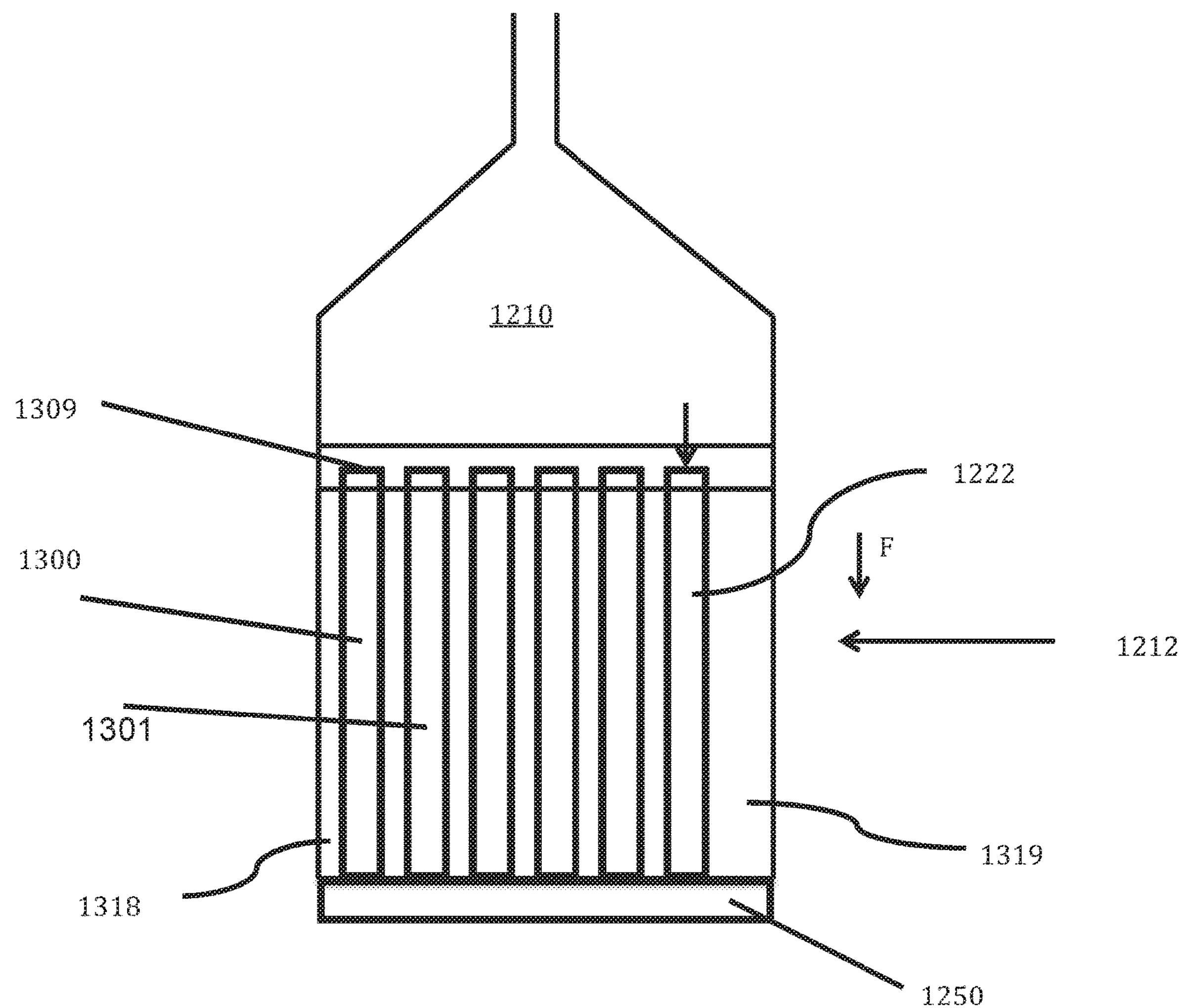
Figure 11:
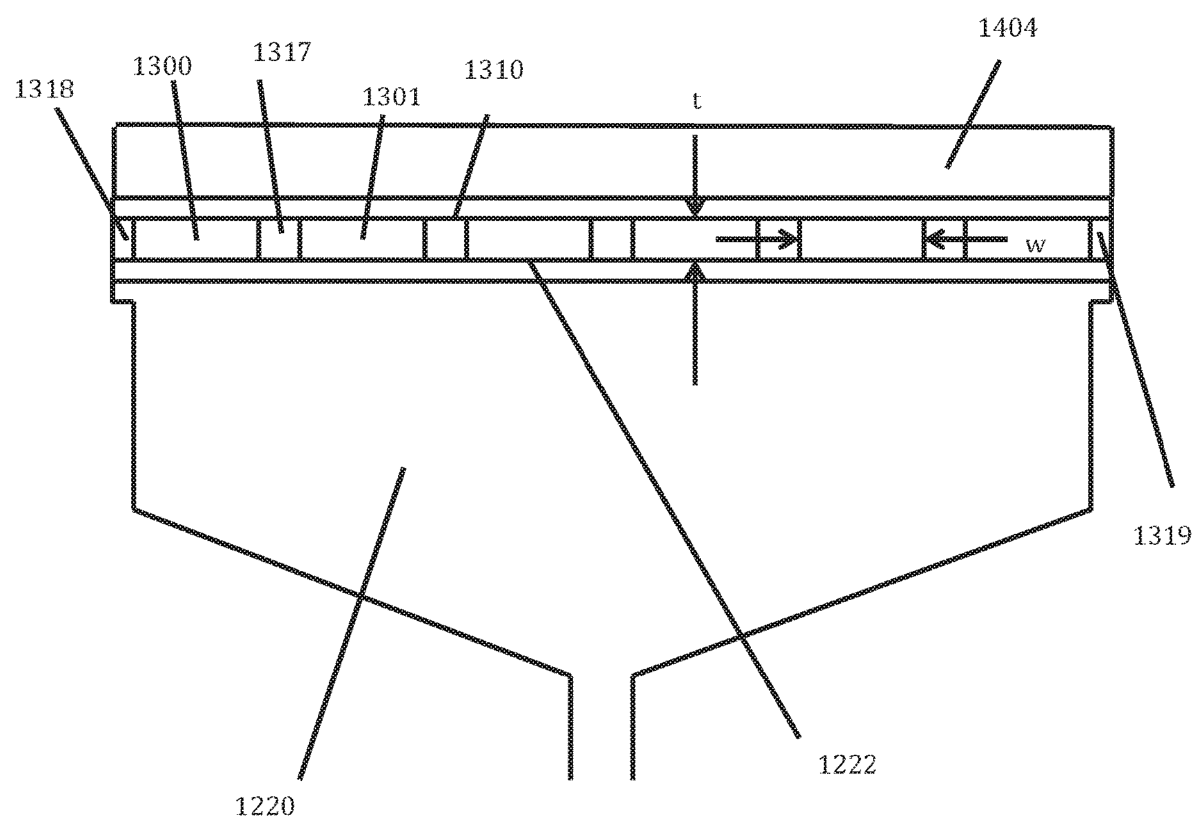
Figure 12:
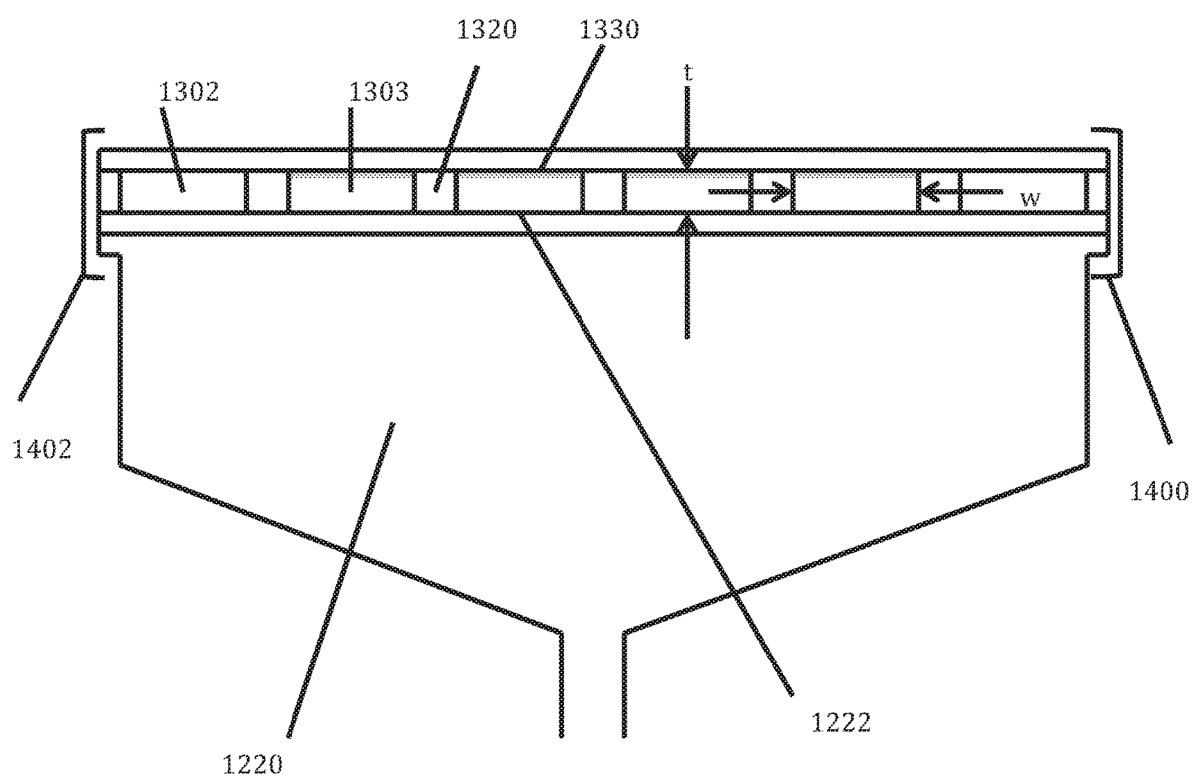
Figure 13:
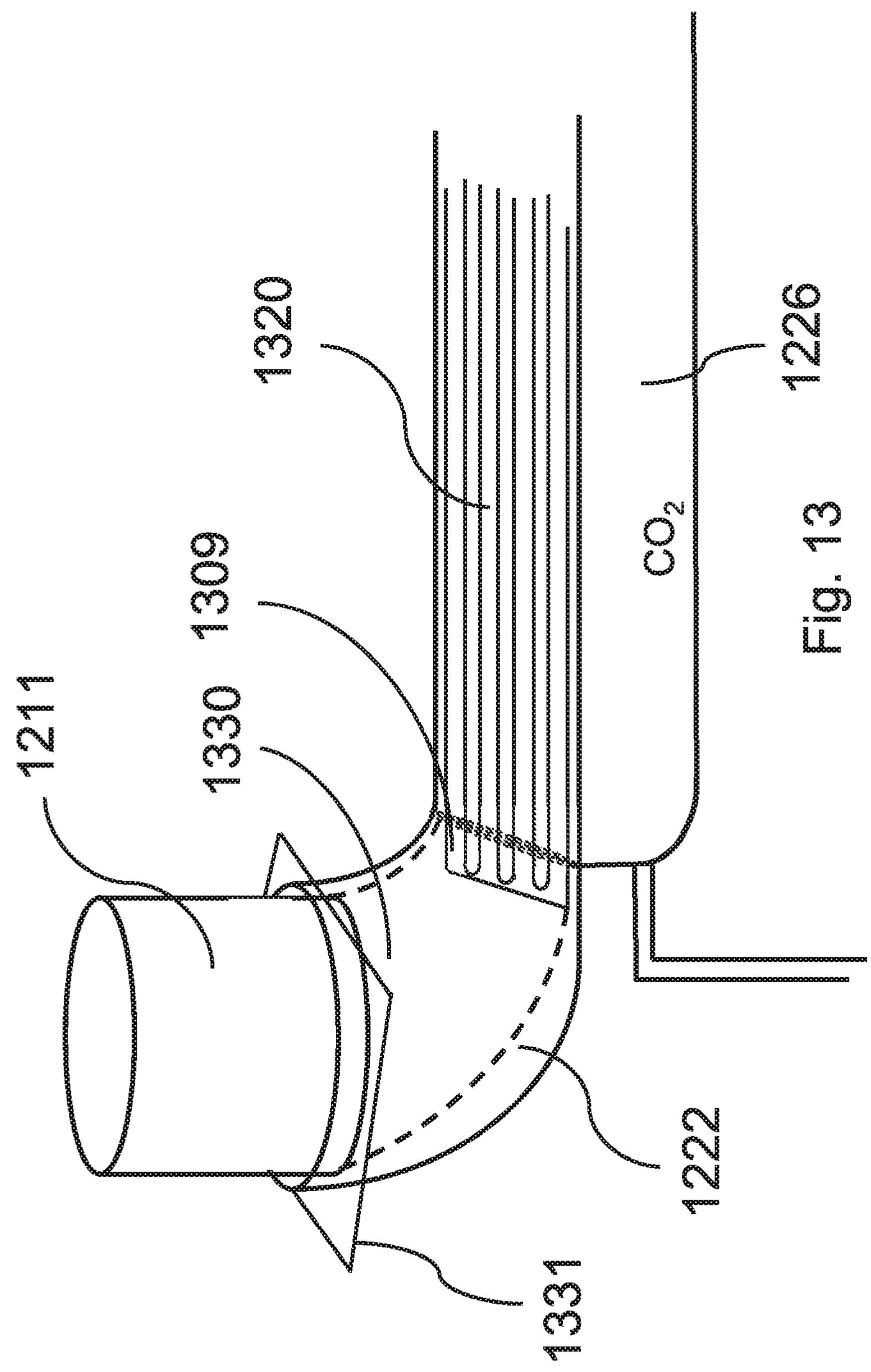
Figure 14:
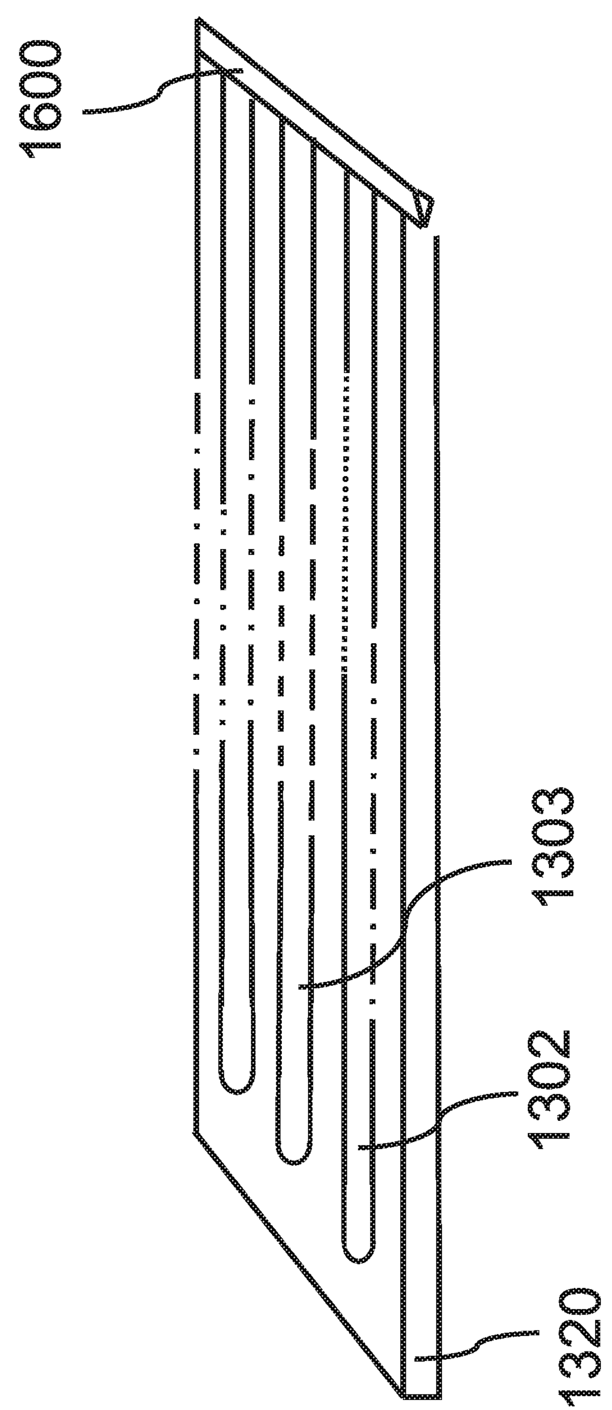
Figure 15:
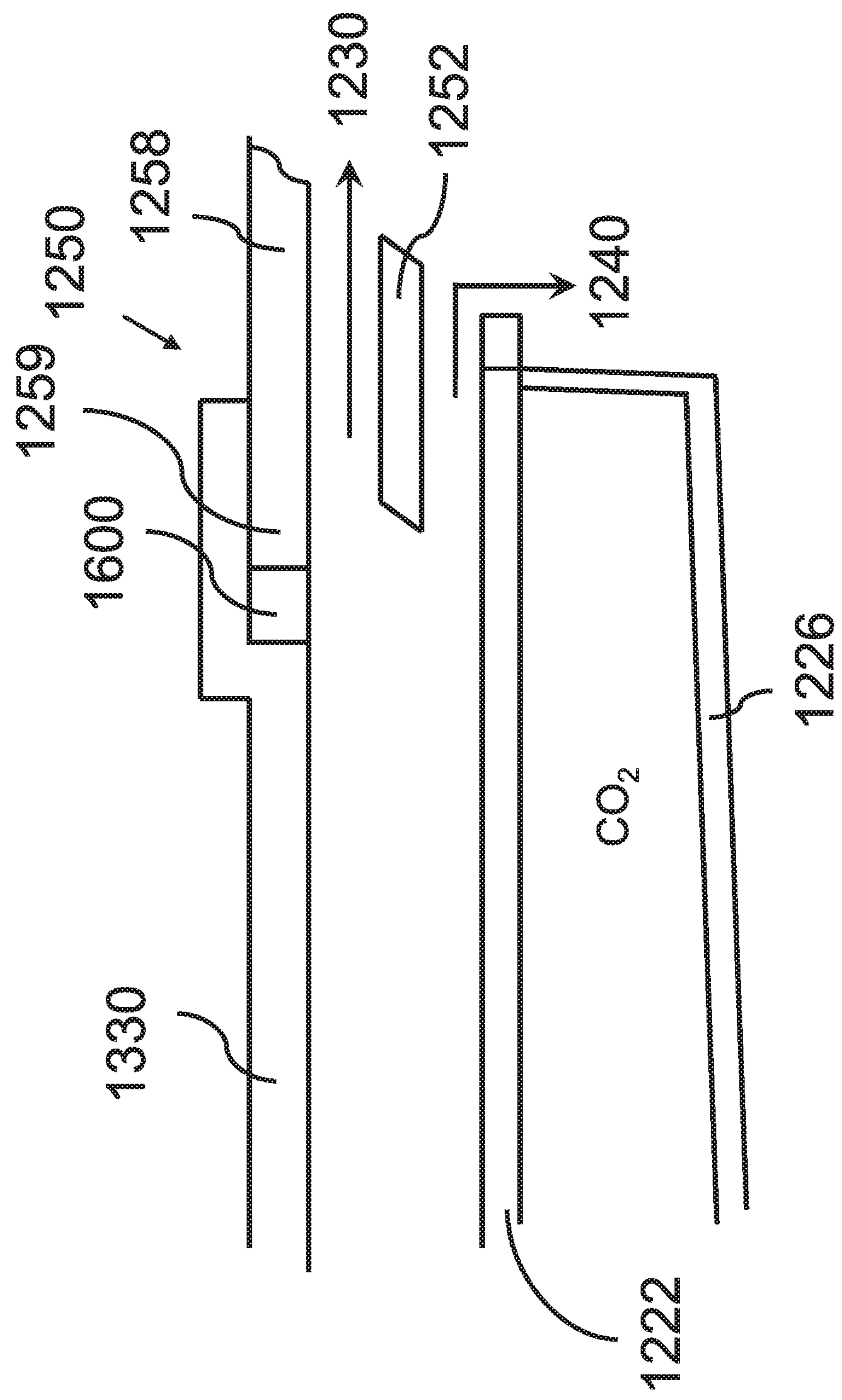

A second embodiment is shown with respect to FIGS. 9 to 16, in which:

FIG. 9 shows the second embodiment of the water filtration device of the present invention schematically;

FIG. 10 shows a schematic top view of the water filtration device of FIG. 9;

FIG. 11 shows a schematic cross sectional view a flow chamber including a sheet and a cover and a channel structure created by tapes;

FIG. 12 shows a schematic cross sectional view of an alternate flow chamber embodiment with a flow chamber including two sheets and a sandwiched channel structure;

FIG. 13 shows an inlet area of the flow chamber of FIG. 12 schematically;

FIG. 14 shows an outlet area of the flow chamber of FIG. 12 schematically;

FIG. 15 shows schematically a removable outlet splitter; and

Figure 16:
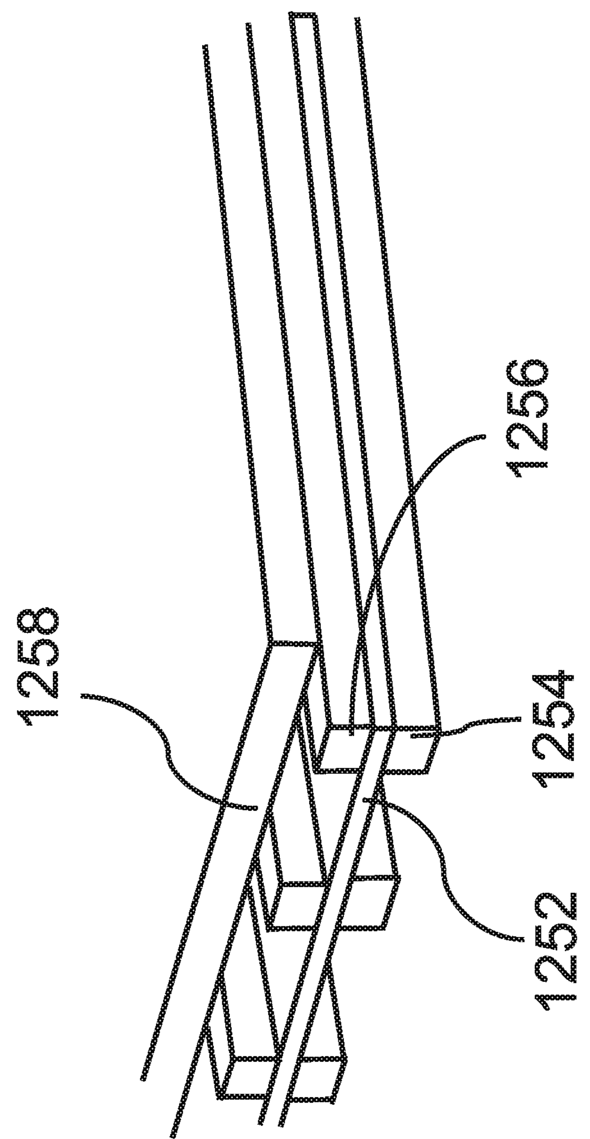

FIG. 16 shows the outlet splitter of FIG. 15 in a schematic view.

Figure 17:
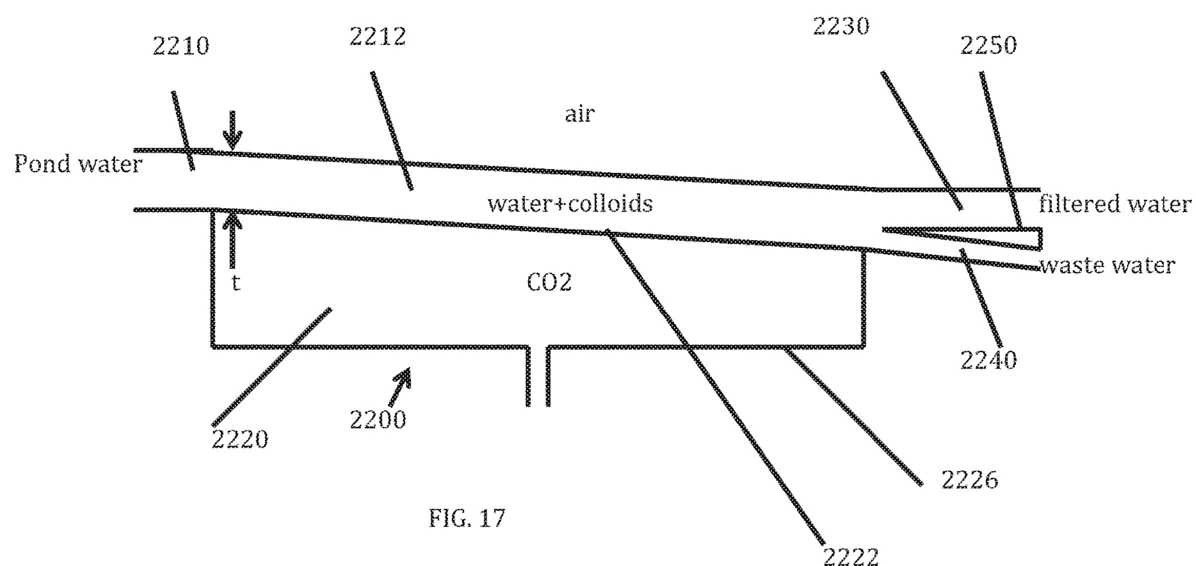
Figure 18:
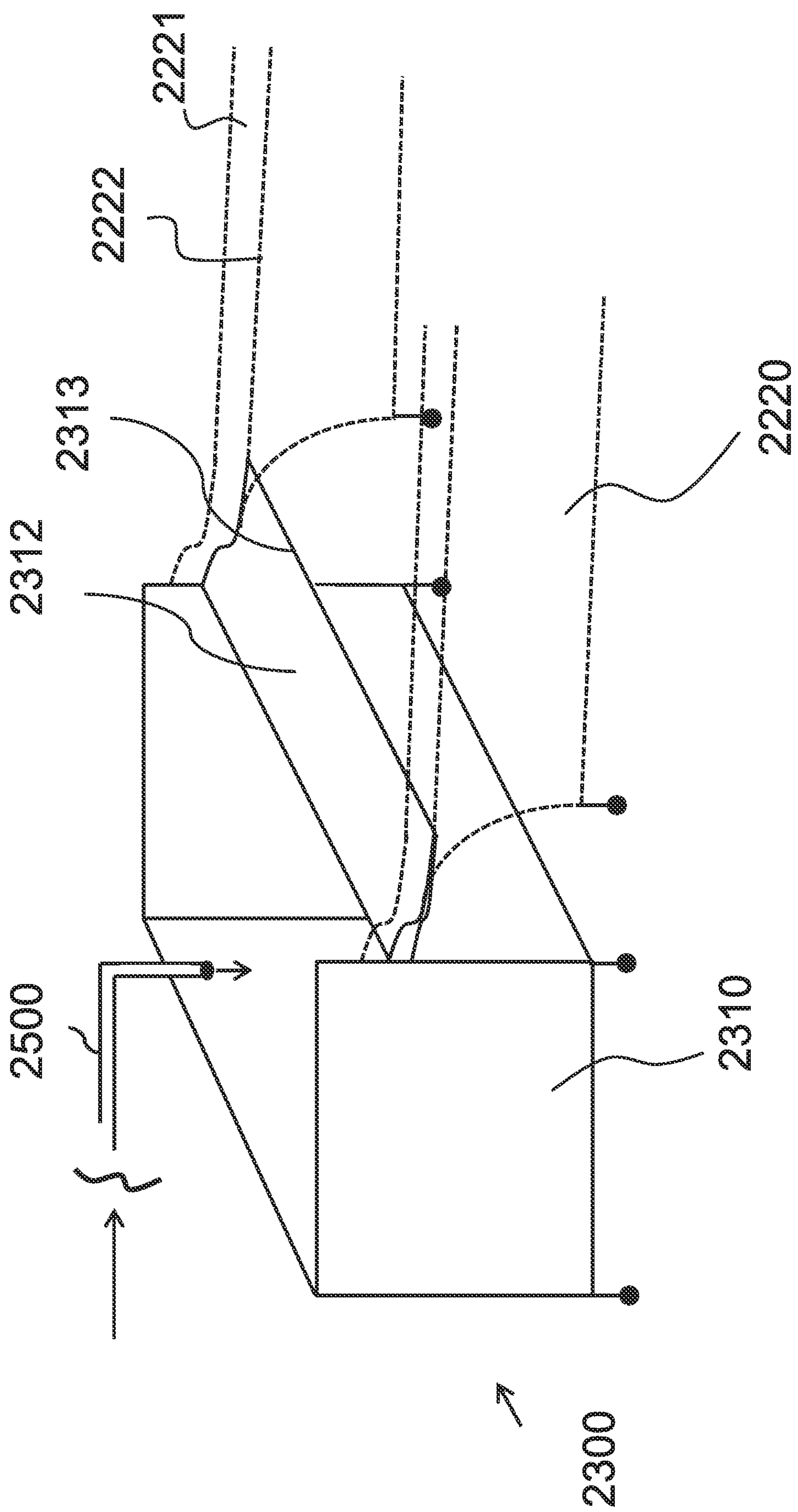
Figure 19:
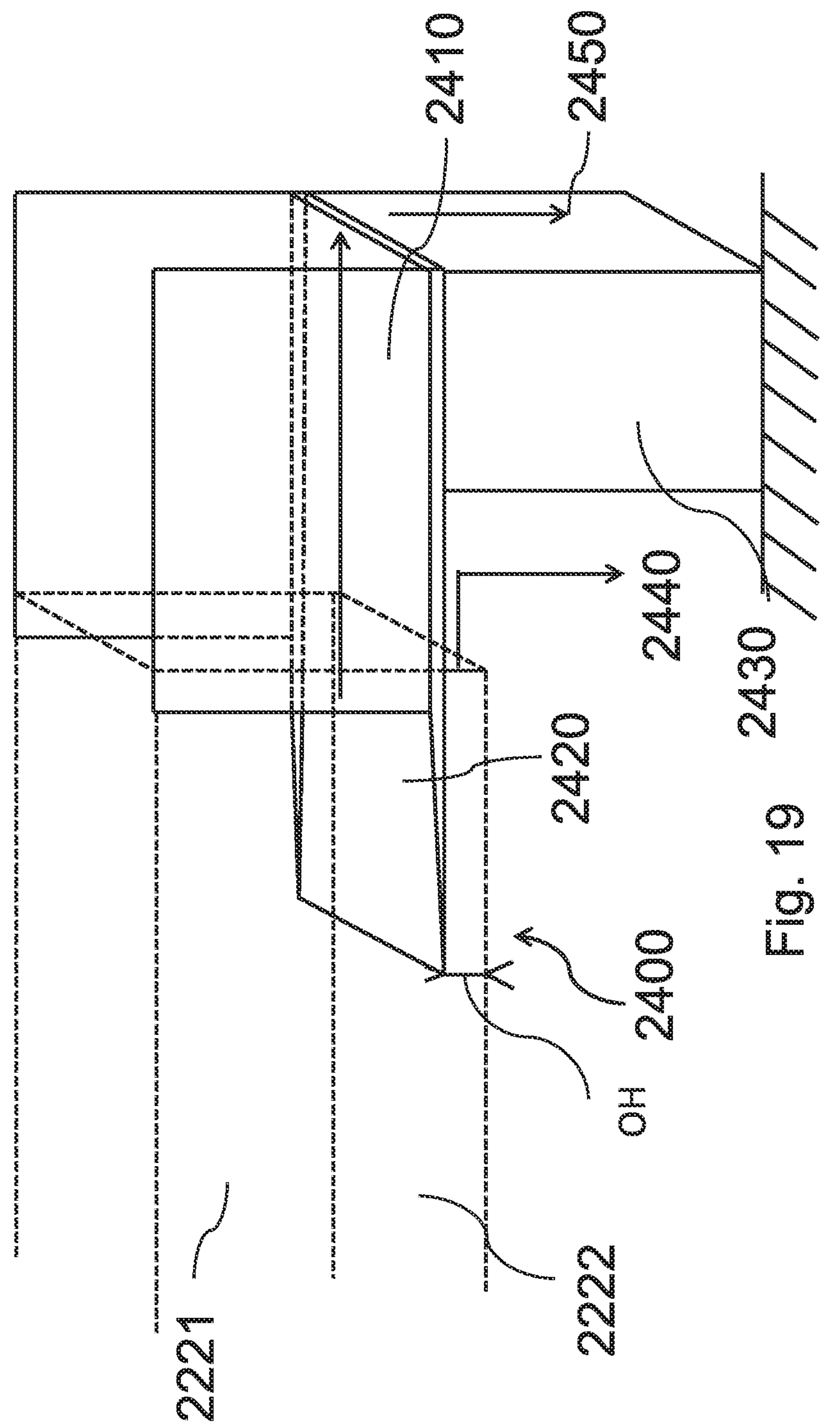

An open channel third embodiment is shown with respect to FIGS. 17 to 19, in which:

FIG. 17 shows an open channel embodiment of the water filtration device of the present invention schematically;

FIG. 18 shows schematically an embodiment of a one inlet manifold according to the present invention; and FIG. 19 shows schematically an alternate embodiment of an outlet of the present invention.

DETAILED DESCRIPTION OF AN EMBODIMENT

Figure 1:
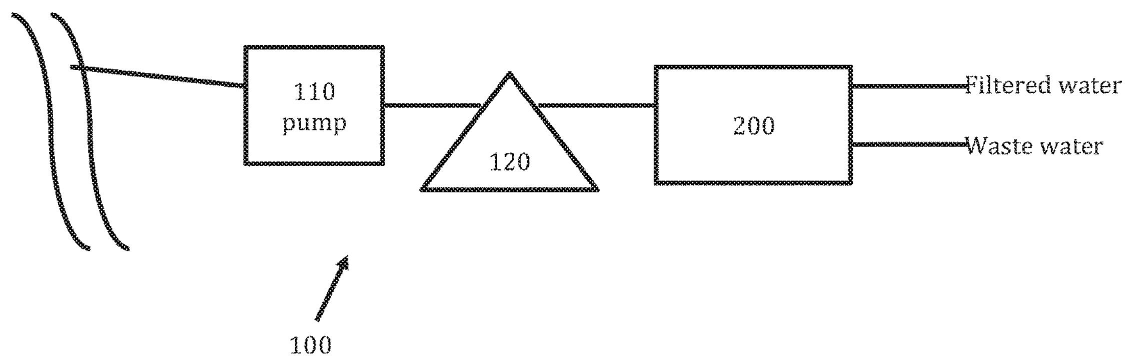
FIG. 1 shows a schematic view of the system.

FIG. 1 shows a water filtration system 100 for cleaning river water, which may contain various particles such as colloidal plastic or metallic particles, and other bioparticles such as bacteria and viruses. Many of these particles are charged negatively or positively. Any type of water with charged colloidal particles may be filtered using the present invention. "Colloidal particle" as defined herein is any particle that can form a colloid or colloidal suspension in water. Such colloidal particles typically range in sizes of a micrometer or less, but larger sizes are possible. The present invention is not limited to filtering colloidal particles, but can also be used to filter larger particles that are impacted by diffusiophoresis, for example even up to 100 nanometers in size or larger, from water. Preferably the particles to be filtered are less than 250 nanometers in size, even if not colloidal. These non-colloidal particles can have very low sedimentation rates, and thus the present invention can aid in "sedimentation" or forcing these larger particles downwardly.

Water filtration system 100 includes a pump 110 pumping water from a river. The pump 110 pumps the water through a sand filter 120 to remove larger particles and impurities. The water with suspended colloidal particles, i.e. a colloidal suspension, then passes to the water filtration device 200 of the present invention.

Water filtration device 200 is designed to remove positively charged colloid particles and other particles, the removal of which can significantly increase the water quality.

Figure 2:
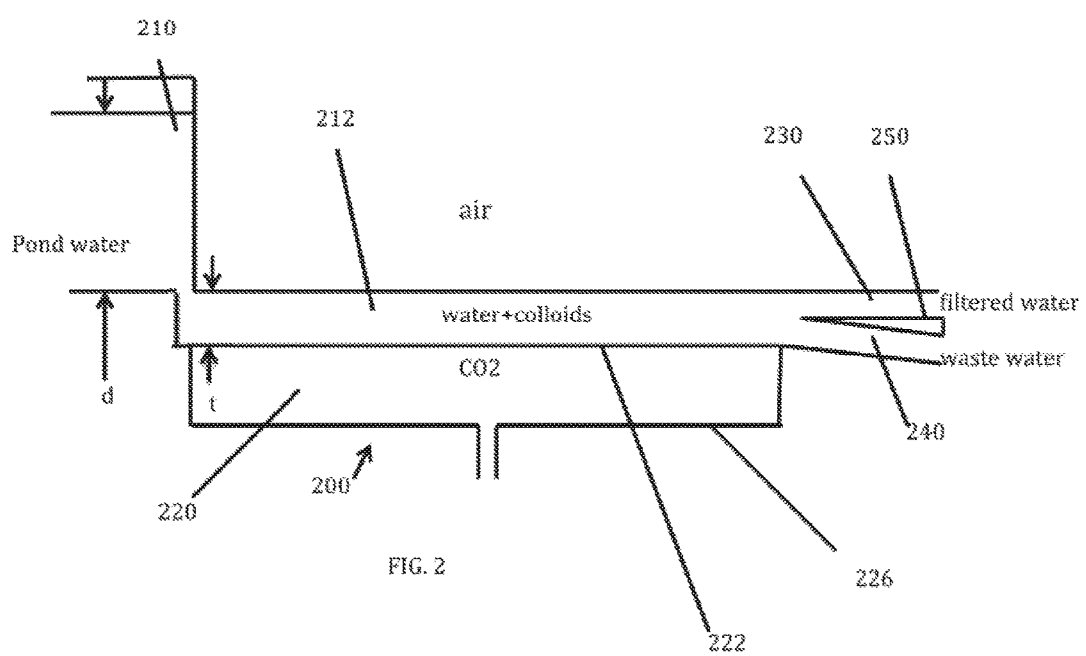
FIG. 2 shows an embodiment of the water filtration device of the present invention schematically.

Water filtration device 200, shown in FIG. 2 schematically, has an inlet manifold 210 receiving pond water with colloidal particles, preferably having passed through a preliminary filter or sedimentation device, such as sand filter 120. However, water filtration device 200 could be upstream of sand filter 120, thereby removing bacteria and other particles that can foul the sand filter 120. Separate water filtration devices 200 could also be both upstream and downstream of sand filter 120.

Inlet manifold 210 spreads the water with colloidal particles in the widthwise direction (into the page in FIG. 2) from a pipe received from sand filter 120. In this example the water with colloidal particles is spread in the inlet manifold to a width of 1 m, and is maintained at a depth d of 1 cm, which height thus regulates the pressure of the suspension that flows into a flow chamber 212. Larger heights can provide larger pressures, and thus faster velocities through the flow chamber 212. The height or a pump can also be used to set the input pressure to a setpoint, for example 1 mbar.

A pressurized gas chamber 220 receives a pressurized gas, such as carbon dioxide, from for example pressurized canisters or an industrial source. Gas chamber 220 has gas tight walls 226, over which sheet 222 can be stretched taut and fastened to in a gas tight manner, for example with fasteners and a sealant. The pressurized gas thus can exit in a uniform manner through the sheet 222. Sheet 222 thus defines the top of gas chamber 220 and the bottom of flow chamber 212.

The colloidal suspension flows from inlet manifold 210 to flow chamber 212 via an exit. Flow chamber 212 can have water tight sidewalls extending from and sealed with respect to sheet 222, and may have a microfluidic or fluid structure therein as will be described. The colloidal suspension thus flows between inlet manifold 210 and two outlets 230, 240 in a flow direction, and, with the closed flow chamber 212 of the present invention, the sheet 222 preferably is in a horizontal orientation to gain the benefit of any gravitational effects on the colloidal particles as they congregate. Other particles present in the water, for example up to 100 nanometers or larger in the largest dimension, can also be impacted positively by gravitational effects.

However, other orientations, even vertical, are possible especially for microfluidic chamber structures where the input pressure is the primary velocity driver.

The carbon dioxide gas permeates the sheet or membrane 222 in a direction normal to the sheet or membrane 222, the normal direction being vertical in the embodiment shown, so as to induce diffusiophoretic motion on positively charged colloidal particles opposite to the direction normal to the membrane, here toward the sheet 222. Negatively charged colloidal particles can move away from the sheet 222, and possibly be filtered, split or suctioned from the top of the suspension. The removal of negatively charged colloidal particles is optional and not necessary in this embodiment.

Outlet 240 thus has water having a higher concentration of positively charged colloidal and other particles, defined as waste water although it can be re-used or refiltered, than a second outlet 230, which can be defined as having filtered water.

A splitter 250, extending widthwise in a wing-shaped manner with a trailing edge of the wing facing the stream, is moveable upwardly or downwardly in this embodiment, and can alter the dimensions of the outlet 240, and thus outlet 230. This adjustment can be a function of the water quality of the filtered water for example, and provides highly advantageous control of water quality, for example as the sources to be filtered are impacted, for example by rainwater.

The splitter 250 may be keyed for example for rotation about a shaft 401 (FIG. 3), the shaft at one end having a worm gear 492 (FIG. 3) movable for example by a worm driven by a motor and controller. Very fine distance gradations thus can be achieved. In the example shown, splitter 250 first can be located at 150 micrometers above the sheet 222 and a bottom of the outlet 240, so that for example 350 micrometers of a 500 micrometer thick stream passes above the splitter. The distance then can be adjusted as a function of the colloidal particle distribution in the thickness direction in the stream, and the front edge of the splitter can rotate so that the distance for example can move from about 100 micrometers above the sheet 222 to about 200 micrometers, for example. Splitting of between 20 percent and 40 percent of a 500 micrometer thick stream thus is possible.

Figure 3:
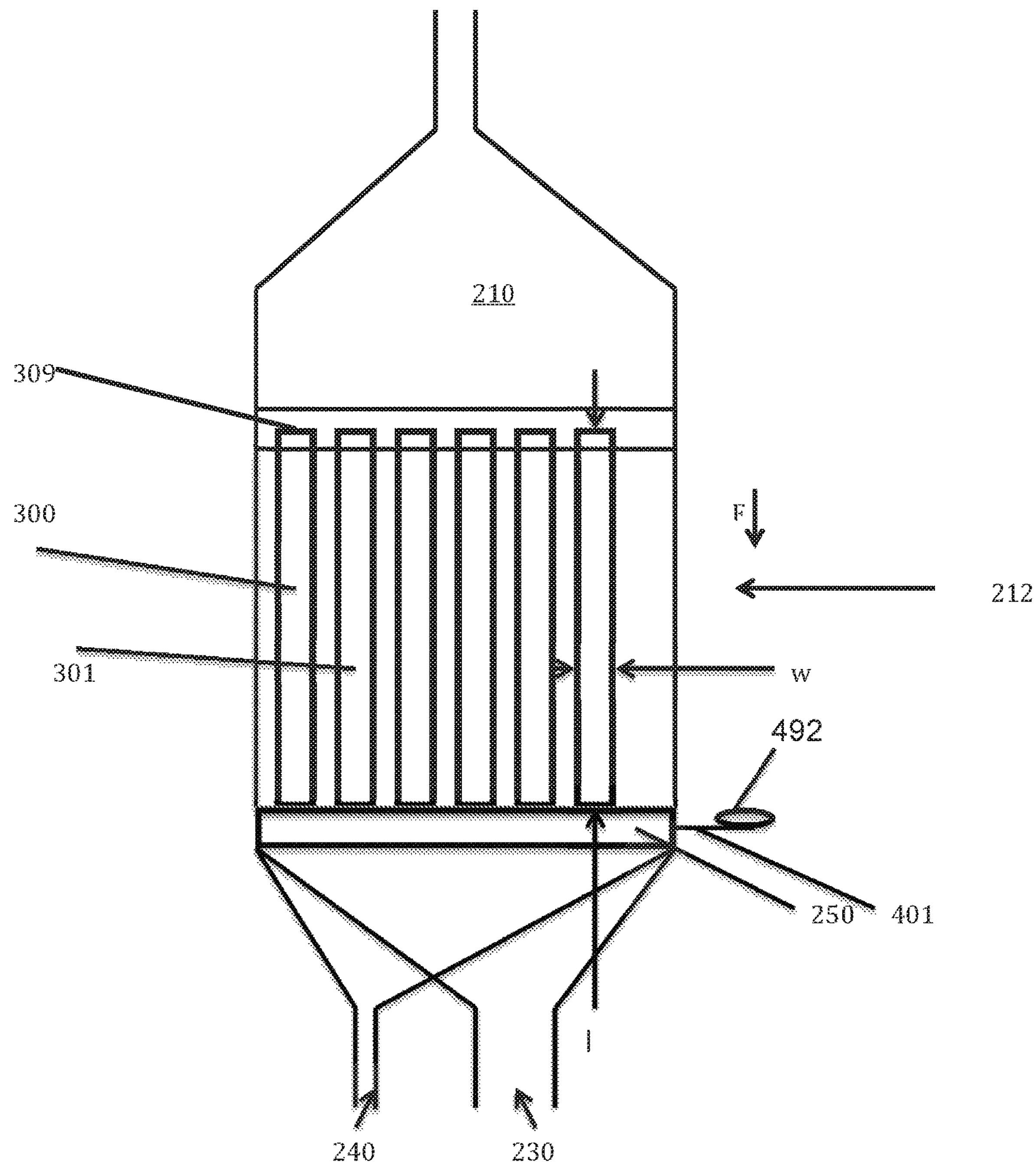
FIG. 3 shows a schematic top view of the water filtration device of FIG. 2.

FIG. 3 shows a schematic top view of the water filtration device of FIG. 2, showing channels 300, 301, which extend a length l in the flow direction F, and a width w in a crosswise direction and have a thickness t (FIG. 2). The exit of inlet manifold 210 extends past front walls 309 of the channels, so the input pressure extant in inlet manifold 210 is transferred to the channels 300, 301. As the depth of the water is typically much larger than the thickness t of the channels 300, 301, the pressure in channels 300, 301 can generally be estimated as the pressure at the exit of the inlet manifold 210.

Figure 4:
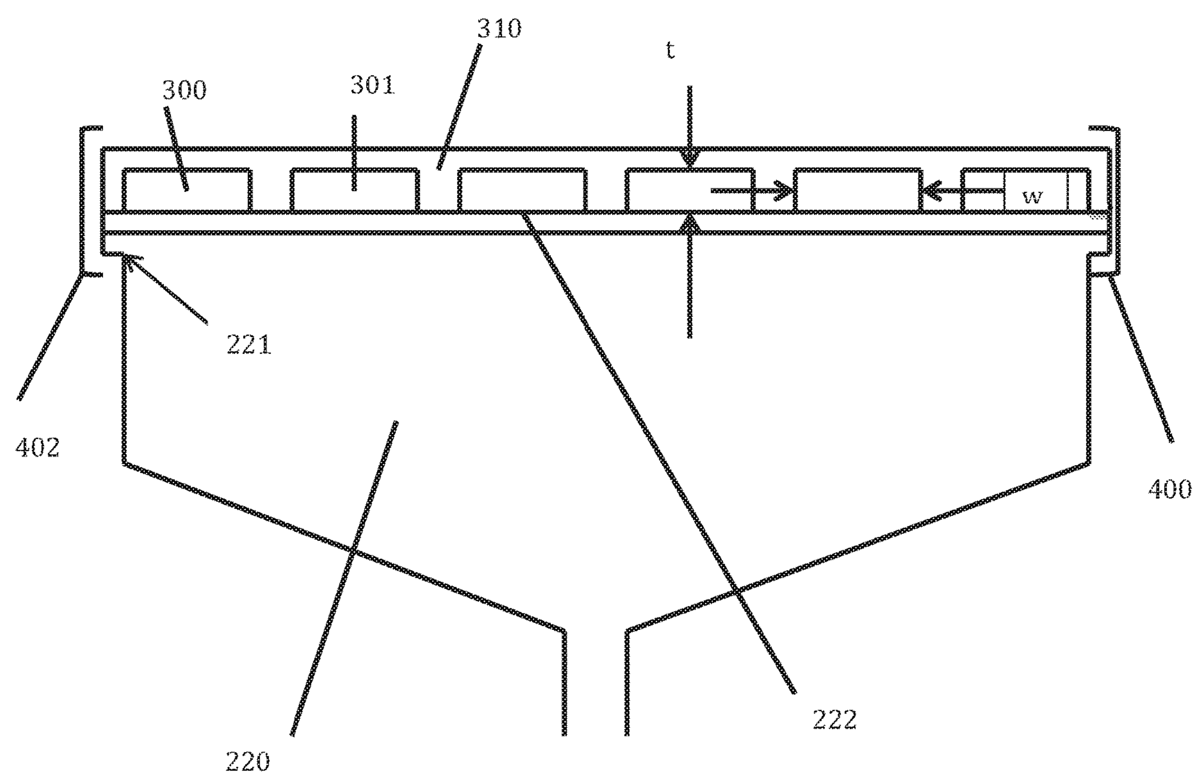
FIG. 4 shows a schematic cross sectional view a first embodiment of a flow chamber including a sheet and one piece cover and channel structure.

FIG. 4 shows a schematic cross sectional view of a first embodiment of a flow chamber 212 including a sheet 222 and one piece cover and channel structure 310, having channels 300, 301 therein. Each channel 300, 301 can for example be of a thickness of 500 micrometers, width of 900 micrometers and extending approximately a meter in length. The cover and channel structure 310 thus may be etched for example via soft lithography into a single piece of PDMS material for example. The straight channels however also permit mechanical or laser cutting. A PDMS barrier b between the channels in the width direction of 100 micrometers can be provided, so that for a width of 1 m, 1000 microchannels can be provided, if for example the two edge barriers are 50 micrometers wide. The single piece 1 m×1 m cover and channel structure can be laid over the PDMS sheet 222, which due to the air pressure from gas chamber 220, presses against the cover from below and forms stable microchannels. The gas chamber can be formed for example of metal and may have longitudinally extending flanges 221 on both lateral sides. Longitudinally extending clamps 400, 402 thus can contact the top of the one piece cover and channel structure 310 and the bottom of the flange 221. Clamps 400, 402 could be for example a two part structure tightenable for example with bolts or screws or made of an elastic material that springs back to provide the clamping action.

The FIG. 4 embodiment provides microchannels for excellent fluid velocity control, and is easily detachable and cleanable. The cover for example can be removed and the channels and the PDMS sheet sprayed with high velocity water. The device can then be quickly reassembled. A distance 311 between an outer surface of the cover facing air, and the top of the channel structure can be for example 10 to 25 micrometers.

Figure 5:
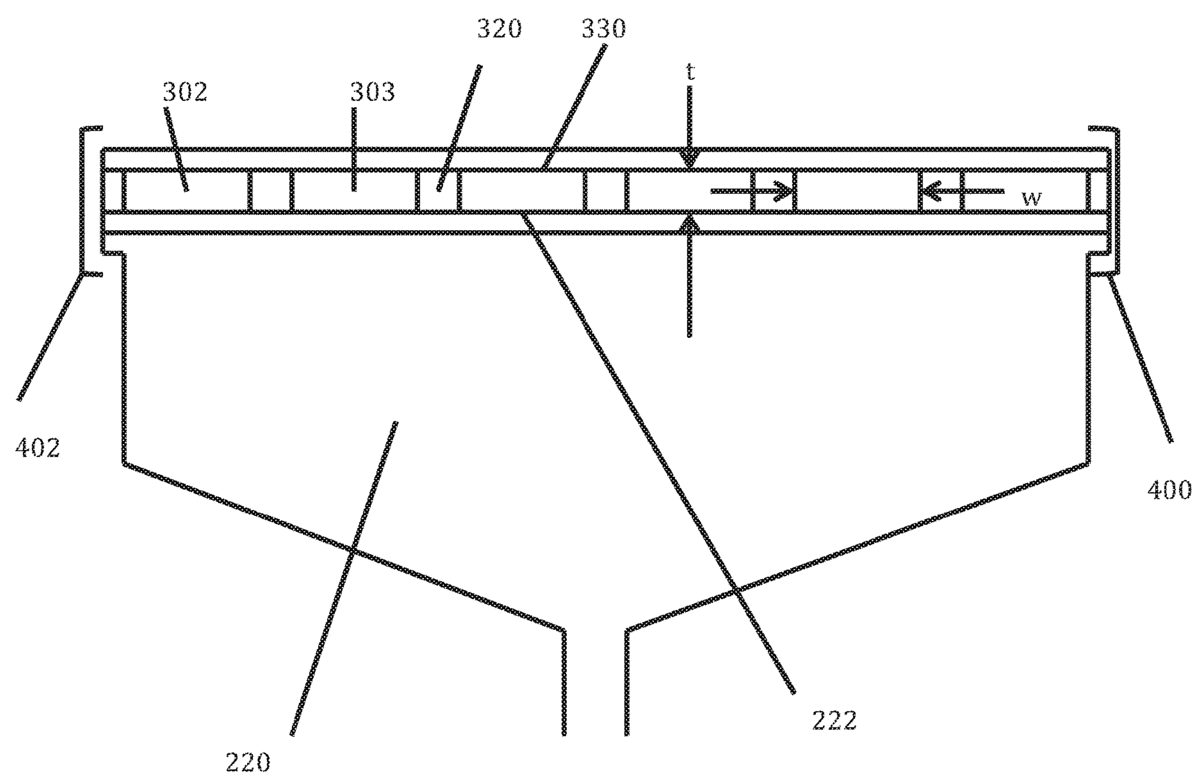
FIG. 5 shows a schematic cross sectional view of a second embodiment with a flow chamber including two sheets and a sandwiched channel structure.

FIG. 5 shows a schematic cross sectional view of a second embodiment with a flow chamber including sheet 222, a cover 330 formed as a second sheet and a sandwiched channel structure 320 forming channels 302, 303. In the second alternate embodiment, the channel structure 320 is provided separately from cover 330, and is sandwiched by the sheet 222 and the cover 330. In this embodiment, cover 330 may be similar to sheet 222 described above, and channel structure 320 may be for example a rectangle made of PVC or other plastic material, or PDMS or other polymer material, with longitudinally extending channels open on the top and bottom to define longitudinally extending holes. Channel structure 320 thus has a thickness t for example of 500 micrometers, and the holes formed by channels 302, 303 can be 900 micrometers wide and extending approximately a meter in length. At the front end, channel structure 320 can be connected so that the inlet is provided by placing a colloidal suspension supply over the holes formed by channels 302, 303, and the rear end can have an outlet structure to divide the outlet stream by connecting the holes at a certain height, for example extending in a V-shape to a rear thickness of 25 micrometers between 125 and 150 micrometers.

Figure 6:
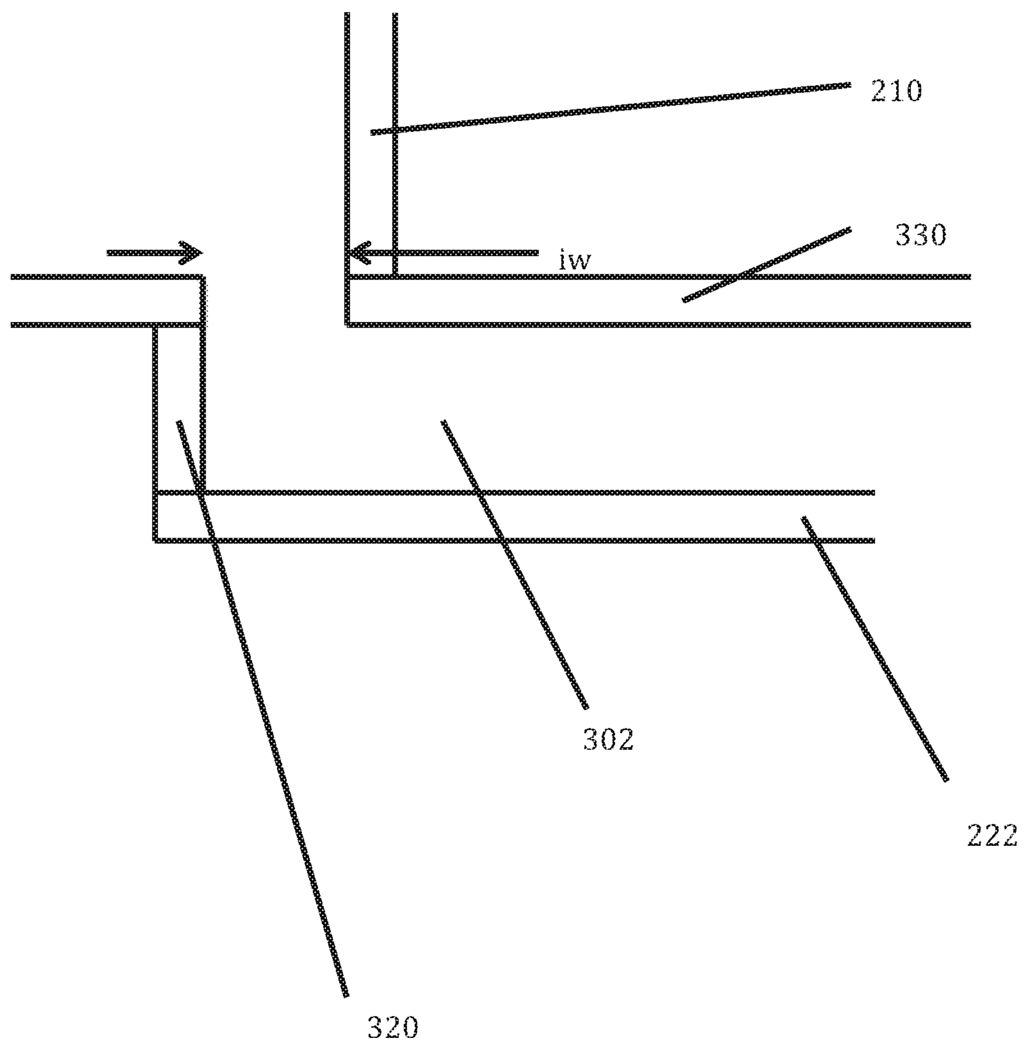
FIG. 6 shows an inlet area of the flow chamber of FIG. 5 schematically.

FIG. 6 shows an inlet area of the flow chamber of FIG. 5 schematically, with the front end of the channel structure 320 shown, and displaying how cover 330 is offset slightly to the rear with respect to sheet 222 to form the inlet distance iw for the channel structure 320. The inlet distance iw preferably is at least as large as thickness t to reduce fouling.

Figure 7:
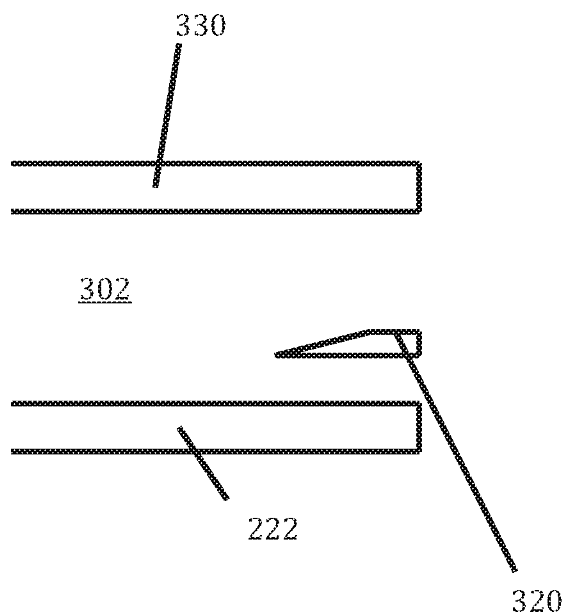
FIG. 7 shows an outlet area of the flow chamber of FIG. 5 schematically.

FIG. 7 shows an outlet area of the flow chamber of FIG. 5 schematically, with for example the rear of the channels 302, 303 (FIG. 6) of channel structure 320 being connected by a fixed splitter, for example at a height of 150 micrometers. The outlet area can be manufactured for example by micromachining or lasering the PVC material.

Figure 8:
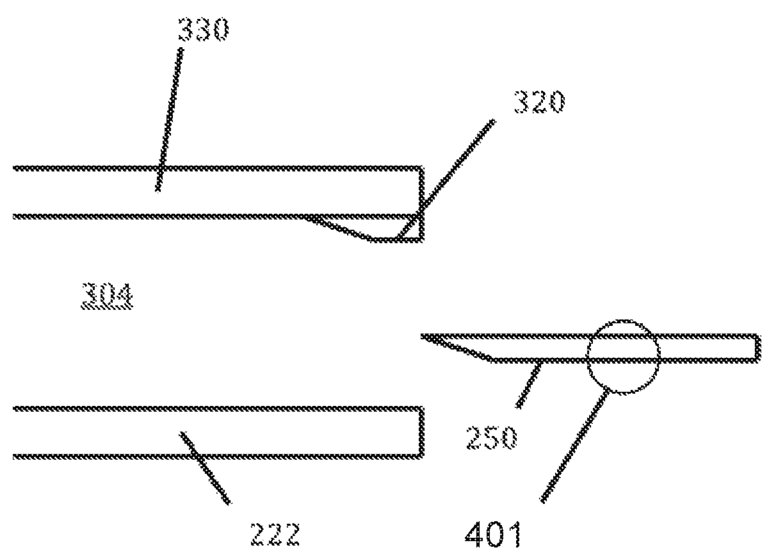
FIG. 8 shows a variable outlet splitter.

FIG. 8 shows a variable outlet splitter 250 rotatable around a shaft 401, with the rear end of channels 304 (similar to 302, 303 in FIG. 6) connected at top connector to keep the channels 304 properly spaced.

The second embodiment also may be clamped in a similar manner to the first embodiment so that the cover 330, channel structure 320 and sheet 222 are clamped to form flow chamber 212. All of the parts can be easily disassembled and cleaned, for example with clean water sprayed at high pressure.

In the two embodiments shown, on one example, the thickness of the channels is 500 micrometers, the width 900 micrometers and the length 1000 mm. Sheet 222 is approximately 1 m×1 m. An input pressure can be for example 1 mbar, or about 1 cm of input depth. Each channel can produce a flow velocity of about 0.00132457 m/s and a flow rate of 0.0357633 mL/min, and has laminar flow with a Reynolds number of about 0.85. The dwell time of the colloidal suspension in the flow chamber 212 is approximately 755 seconds. The colloidal particle diffusiophoretic velocity will vary with colloidal particle zeta potential and concentration gradients over the thickness of the flow chamber, and the exact velocity for each colloid will vary. However, colloidal particle diffusiophoretic velocities of between 1 to 10 micrometer per second are typical, as stated in the "Origins of concentration gradients for diffusiophoresis" noted above at page 4687. Thus most positively charged colloidal particles, even if at the top of the input stream at the beginning of flow chamber 212, will move, by the time the fluid has moved through the flow chamber 212 to outlet 240. A diffusiophoretic velocity of 1 micrometer per second would move colloidal particles by 755 micrometers, which is larger than the thickness of the fluid, and thus congregate the positively charged colloidal particles at the bottom of the stream at the outlet 240.

The flow rate overall for 1000 microchannels thus is 35.76 mL/min or 2.146 liters per hour, and with a slitter height of 150 micrometers, a filtered water to waste water split ratio is 70% to 30%, and a filtered water output is 1.5 liters per hour.

The embodiment channel structure described above has a minimum distance of 500 micrometers, which for most colloidal suspensions is sufficient to reduce fouling. Smaller channel thicknesses of 20 micrometers or even smaller could be possible depending on the application, but thicknesses of 100 micrometers or more are preferred. The concentration gradients and diffusiophoretic velocities at higher thicknesses may be smaller, but the laminar flow and length of the flow chamber can compensate for these effects. A thickness of 600 micrometers for example instead of 500 micrometers, with other sizes remaining the same, increases the flow rate to almost 3.91/h, with 2.7 liters per hour of filtered water, almost doubling output. The dwell time is 555 seconds, also leading to most positively charged colloidal particles moving via diffusiophoresis to congregate at the bottom of the stream by the time they reach outlet 240.

To maintain concentration gradients and laminar flow however, channel thicknesses of 1 mm or less are preferred, and sufficient to reduce most fouling.

The present device allows for a simply-constructed, relatively large flow rate water filtration device that can be generally free of fouling and easy to clean and maintain, all with low energy consumption. Particles that become lodged in the channel structure can be removed during cleaning, and blockages are reduced. Thus even smaller channel structures, such as 20 micrometer thickness channel structures or smaller could be used, depending on the colloidal particles to be filtered.

The present invention also provides that the partially filtered colloidal suspension, without the positively charged colloidal particles, can pass to a negative charged colloid filter in which air is present at the bottom and carbon dioxide at the top. In this case the sheet and pressurized gas chamber can be on the top, and move the negatively charged colloidal particles downwardly through diffusiophoretic motion. This optional downstream filter can be used with or without first attempting removal of the negatively charged colloidal particles from the positively charged colloidal particle filter described in detail herein, and can be added depending on the type of colloidal suspension being filtered.

FIGS. 9 to 16 show a second embodiment, which has a narrower structure.

Water filtration device 1200, shown in FIG. 9 schematically, has an inlet manifold 1210 receiving pond or river water with colloidal particles, preferably having passed through a preliminary filter or sedimentation device, such as sand filter 120 (FIG. 1). However, water filtration device 1200 could be upstream of sand filter 120, thereby removing bacteria and other particles that can foul the sand filter 120. Separate water filtration devices 1200 could also be both upstream and downstream of sand filter 120.

Inlet manifold 1210 spreads the water with colloidal particles in the widthwise direction from a pipe connected to sand filter 120. Inlet manifold 1210 includes a vertical height regulator 1211 which in this example can be a clear polycarbonate tube 7.5 cm in interior diameter and 1 meter in height and held by a stand 1214. Water can be filled to a specific height in the pipe 1211 and maintained at that height by the flow rate of water supplied from sand filter 120, which can equal the flow rate of the suspension through water filtration device 1200. In this example the water with colloidal particles is spread in the inlet manifold from the 7.5 cm tube to a width of 12 cm and is maintained at a depth d of 51 cm, which height thus regulates the pressure of the suspension that flows into a flow chamber 1212. Larger heights can provide larger pressures, and thus faster velocities through the flow chamber 1212. The height or a pump can also be used to set the input pressure to a setpoint, for example 50 mbar, which equates to 51 cm of water height.

A pressurized gas chamber 1220 receives a pressurized gas, such as carbon dioxide, from for example pressurized canisters or an industrial source 1228. Gas chamber 1220 has a gas tight wall 1226, over which membrane 1222 can be stretched taut and fastened to in a gas tight manner, for example with fasteners. Advantageously, due to the stretchable nature of membrane 1222, which is for example made of PDMS, the membrane 1222/wall 1226 interaction can be sealant-free, especially on the sides. In one embodiment, gas chamber 1220 can be made of galvanized steel, for example cut from 12.5 cm wide half-round galvanized steel gutter and sealed at both ends with galvanized steel caps. A hole for the pressurized gas can be cut in one of the end caps.

The pressurized gas thus can exit in a uniform manner through the membrane 1222. Membrane 1222 thus defines the top of gas chamber 1220 and the bottom of flow chamber 1212.

The colloidal suspension flows from inlet manifold 1210 to flow chamber 1212 via an inlet manifold exit. Flow chamber 1212 can have water-tight sidewalls 1318, 1319 extending from and sealed with respect to membrane 1222, and these sidewalls 1318, 1319 may be for example made of PTFE tape taped onto the membrane 1222. The PTFE tapes may for example be 250 micrometer thick (10 mil) skived PTFE tapes, 5 mm wide, with acrylic adhesive available from CS Hyde Co. of Lake Villa, Ill.

These tapes may also be used to provide a microfluidic or fluid structure therein as will be described. The colloidal suspension thus flows between inlet manifold 1210 and an outlet splitter 1250 with two outlets 1230, 1240 (FIG. 15) in a flow direction, and, with the closed flow chamber 1212 of the present invention, the membrane or sheet 1222 preferably is in a horizontal orientation to gain the benefit of any gravitational effects on the colloidal particles as they congregate. Other particles present in the water, for example up to 100 micrometers or larger in the largest dimension, can also be impacted positively by gravitational effects.

However, other orientations, even vertical, are possible especially for microfluidic chamber structures where the input pressure is the primary velocity driver.

The carbon dioxide gas permeates the sheet or membrane 1222 in a direction normal to the sheet or membrane 1222, the normal direction being vertical in the embodiment shown in FIG. 11, so as to induce diffusiophoretic motion on positively charged colloidal particles opposite to the direction normal to the membrane, here toward membrane 1222. Negatively charged colloidal particles can move away from membrane 1222, and be filtered, split or suctioned from the top of the suspension. An outlet splitter 1250 can split the stream to remove one or both of the sides of the stream in a heightwise direction, but need not remove both of the positively or negatively charged colloidal particles at the same time. The filtrate can be passed again through the device or a subsequent device to remove the other of the particles if the splitter solely has two outlets. Outlet splitter 1250 will be described in more detail with regard to FIGS. 15 and 16 below.

FIG. 10 shows a schematic top view of the water filtration device of FIG. 9, showing channels 1300, 1301, which extend a length l in the flow direction F, and a width w in a crosswise direction and have a thickness t (FIG. 11). The exit of inlet manifold 1210 extends past front walls 1309 (if present) of the channels, so the input pressure extant in inlet manifold 1210 is transferred to the channels 1300, 1301. As the depth of the water is typically much larger than the thickness t of the channels 1300, 1301, the pressure in channels 1300, 1301 can generally be estimated as the pressure at the exit of the inlet manifold 1210.

FIG. 11 shows a schematic cross sectional view a first embodiment of a flow chamber 1212 including a sheet 1222 and a cover and channel structure 1310, having channels 1300, 1301 therein. Each channel 1300, 1301 can for example be of a thickness of 250 micrometers, width of 25 millimeters and extending approximately 1.2 meters in length, and be defined by PTFE tapes 1318, 1319 at the edges, and tapes 1317 between the edges. The cover and channel structure 1310 thus may be made easily by taping the tapes directly on membrane 1222 with the adhesive side, while the top sides of the tape maybe contacted by a further membrane 1310 that sits on the top sides of the tape and may be held there for example by an alternate or additional weight 1404 which may be for example a honeycomb structure for example made of steel, and thus can define a clamp with edges or flanges of the gas chamber 1220. Three PTFE tapes 1317, 1318, 1319 between the channels in the width direction of 5 mm can be provided, so that for a width of 12.5 cm, 4 microchannels can be provided, if for example the two edge barriers also are PTFE tapes 5 mm wide. The PDMS sheet 1222, which due to the air pressure from gas chamber 1220, presses from below and forms stable microchannels, which can be aided by the air-permeable weight 1404. The gas chamber 1220 can be formed for example of metal, and may have longitudinally extending flanges 1221 on both lateral sides, or be the gutter material mentioned above. However, clamps 1400, 1402 (FIG. 5), which generally are an alternative to the weight 1404, could be for example a two part structure tightenable for example with bolts or screws or made of an elastic material that springs back to provide the clamping action The FIG. 11 embodiment provides microchannels for excellent fluid velocity control, and is easily detachable and cleanable. The cover 1310 for example, can be removed and the channels and the PDMS sheet and tapes, as well as the cover sprayed with high velocity water. The device can then be quickly reassembled. A distance 1311 between an outer surface of the cover facing air, and the top membrane 1310 can be for example 10 to 25 micrometers thick. Top membrane 1310 also can be one piece with bottom membrane 1222, and simple folded over around one of the tapes 1318, 1319 and then clamped. Such a folded integral single membrane structure can aid in possible leakage out one side, and also aid in sealing the inlet manifold.

FIG. 12 shows a schematic cross sectional view of a second embodiment with a flow chamber including sheet 1222, a cover 1330 formed as a second sheet and a sandwiched channel structure 1320 forming channels 1302, 1303. In the second alternate embodiment, the channel structure 1320 is provided separately from cover 1330, and is sandwiched by the membrane or sheet 1222 and the cover 1330. In this embodiment, cover 1330 may be similar to membrane or sheet 1222 described above, and channel structure 1320 may be for example a rectangle made of PVC or other plastic material, or PDMS or other polymer material, with longitudinally extending channels open on the top and bottom to define longitudinally extending holes. Channel structure 1320 thus has a thickness t for example of 250 micrometers, and the holes formed by channels 1302, 1303 can be 25 millimeters wide and extending approximately 1.2 meters in length. At the front end, channel structure 1320 can be connected so that the inlet manifold 1210 is provided as in FIG. 9 by placing the colloidal suspension supply over the holes formed by channels 1302, 1303, and the rear end can have an outlet splitter to divide the outlet stream as will be described. Longitudinally extending clamps 1400, 1402 can contact the top of the cover 1330 and the bottom of the flange 1221 to clamp the membrane 1222, channel structure 1320 and cover 1330 to the gas chamber 1220.

FIG. 13 shows an inlet area of the flow chamber of FIG. 12 schematically, with the front end of the channel structure 1320 shown, and with top membrane 1330 and bottom membrane 1222 curving up over the end 1309 to wrap around and seal pipe 1211. The PDMS material is rather sticky and can provide a water-tight seal between the top membrane and the bottom membrane without extra adhesive, although a sealant could also be used to seal the membranes 1222, 1330 to each other as the membranes curve to the pipe 1211. A clamp 1331 can clamp the membranes 1222, 1330 to the pipe 1211.

FIG. 14 shows an embodiment of the channel structure 1320 made for example of 250 micrometer thick plastic with channels 1302, 1303 cut therein. The channels preferably are open at the outlet end to allow proper splitting. However, a cross bar 1600, for example made of 1 mm thick plastic, can be attached to the outlet end to stabilize the channel structure, and still not alter the outlet splitting as will be described.

FIG. 15 shows an outlet area of the flow chamber 1212 schematically.

As shown in FIGS. 15 and 16, outlet splitter 1250 thus can have water having a higher concentration of positively charged colloidal and other particles at an outlet 1240, defined as waste water although it can be re-used or refiltered, than at second outlet 1230, which can be defined as having filtered water. The opposite definitions are possible however. For example a distilled water/iron oxide colloidal suspension with negatively charged iron oxide particles of an average particle size of 30 nanometers can be run through the device 1200, and the water exiting at outlet 1240 with a lower concentration of the iron oxide particles can be defined as filtered water, with the second outlet 1230 away from membrane 1222 being defined as waste water with a higher concentration of iron oxide particles.

Splitter 1250 may be made for example from a 20 micrometer thick, 12.5 cm wide plastic sheet 1252, such as available commercially as a shim, that fits between two sets of 125 micrometer thick tapes 1254, 1256 spaced widthwise to match tapes defining the channels 1300, 1301. The top set of tapes can be supported on a think steel or other splitter support 1258 for example a galvanized steel 1 mm thick, 12.5 cm wide sheet.

Splitter 1250 thus can be removable as a whole and replaceable with other sized outlets 1240, 1230. For example thinner tapes or three outlet structures could be used. Moreover, as shown in FIG. 15, top membrane 1330 advantageously can seal the front end 1259 of removable splitter 1250 without the need for permanent sealants. The thickness of the splitter sheet 1252 thus can be easily compensated for via the membrane elasticity.

In the example shown, splitter 1250 first can be located at 125 micrometers above membrane 1222 and at bottom of the outlet 1240, so that about 125 micrometers of a 250 micrometer thick stream passes above the splitter sheet 1252. Other sheet thicknesses thinner than 20 micrometers are possible, although the 20 micrometer thickness aids in stability especially if wider, for example 2.5 cm wide, channels are used.

The second embodiment also may be clamped in a similar manner to the first embodiment so that the cover 1330, channel structure 1320 and sheet 1222 are clamped to form flow chamber 1212. All of the parts can be easily disassembled and cleaned, for example with clean water sprayed at high pressure.

In the two embodiments shown, on one example, the thickness of the channels can be 250 micrometers, the width 25000 micrometers and the length 1200 mm. Membrane 1222 is approximately 12.5 cm wide×1.2 m long. An input pressure can be for example 50 mbar, or about 51 cm of input depth. Each of the four channels can produce a flow velocity of about 0.032729 m/s. A flow rate of 0.20455 mL/s (0.032729*250*25) or 12.2 ml/min, and has laminar flow with a Reynolds number of about 16. The dwell time of the colloidal suspension in the flow chamber 212 is approximately 36.7 seconds. The colloidal particle diffusiophoretic velocity will vary with colloidal particle zeta potential and concentration gradients over the thickness of the flow chamber, and the exact velocity for each colloid will vary. However, colloidal particle diffusiophoretic velocities of between 1 to 10 micrometer per second are typical, as stated in the "Origins of concentration gradients for diffusiophoresis" noted above at page 4687. Thus most positively charged colloidal particles, even if at the top of the input stream at the beginning of flow chamber 1212, will move by the time the fluid has moved through the flow chamber 1212 to outlet 1240. A diffusiophoretic velocity of 5 micrometer per second would move colloidal particles by 183 micrometers, which is larger than half the thickness of the fluid, and thus congregate the negatively charged colloidal particles at the top of the stream at the outlet 1230, and any positively charged colloids at stream of outlet 1240.

The width of the channels being at least 1 cm is advantageous in that a large flow rate can be achieved for a channel. While some membrane bulging is disadvantageously present, with a weighted structure for example acting on the tapes and the water pressure forcing the water through, the bulging is less of a factor than might otherwise be expected for such thin membranes.

The flow rate overall for 4 microchannels thus is 48.8 mL/min or 2.928 liters per hour, and with a splitter height of 125 micrometers, a filtered water to waste water split ratio is approximately 50% to 50%, and a filtered water output is about 1.5 liters per hour.

The embodiment channel structure described above has a thickness of 250 micrometers, which for most colloidal suspensions is sufficient to reduce fouling. Smaller channel thicknesses of 20 micrometers or even smaller could be possible depending on the application, but thicknesses of 100 micrometers or more are preferred. The concentration gradients and diffusiophoretic velocities at higher thicknesses may be smaller, but the laminar flow and length of the flow chamber can compensate for these effects.

To maintain concentration gradients and laminar flow however, channel thicknesses of 1 mm or less are preferred, and sufficient to reduce most fouling.

The present device in the second embodiment allows for a simply-constructed, relatively large flow rate water filtration device that can be generally free of fouling and easy to clean and maintain, all with a low energy consumption, and can be used for testing to scale to even larger filtration devices using wider membranes. Particles that become lodged in the channel structure can be removed during cleaning, and blockages are reduced. Thus even smaller channel structures, such as 20 micrometer thickness channel structures or smaller could be used, depending on the colloidal particles to be filtered. Since there is no gas channel structure other than a single plenum, construction and manufacturing is also simplified.

A third open-channel embodiment is shown in FIGS. 17 to 19.

Water filtration device 2200, shown in FIG. 17 schematically, has an inlet 2210 receiving pond or river water with colloidal particles, preferably having passed through a preliminary filter or sedimentation device, such as sand filter 120 (FIG. 1). However, water filtration device 2200 could be upstream of sand filter 120, thereby removing bacteria and other particles that can foul the sand filter 120. Separate water filtration devices 2200 could also be both upstream and downstream of sand filter 120.

An inlet manifold 2300 (FIG. 18) spreads the water with colloidal particles in the widthwise direction (into the page in FIG. 17) from a pipe received from sand filter 120 and allows inlet 2210 an even pressure of water across the width of the inlet 2210. In a preferred example, the water with colloidal particles is spread to a width of 10 m, and has a thickness of 4 mm, and flows at a speed of 0.105 m/s as it exits inlet manifold 2300. The flow rate of the pond or river water to be filtered thus is 0.0042 cubic meter per second or 252 liters per hour. The water with colloids thus runs at 4 mm thickness over a sheet 2222 at the bottom a flow chamber 212, in this example an SSP-M823 silicone membrane of 0.005 inches thickness made of PDMS from Specialty Silicone Products, Inc. If the Manning's roughness coefficient n value of the silicone can be estimated as about 0.012, and the colloidal suspension runs at a slope of 0.25 cm/m, a Reynolds number of approximately 1680 (estimated for open channel flow as 4*hydraulic radius*v/kinematic viscosity) and a Froude number of about 0.53 results. Laminar and subcritical flow thus can result. The Reynolds number preferably is 2300 or less and most preferable 2000 or less, and the Froude number less than 1.0.

FIG. 18 shows one embodiment of inlet manifold 2300 using a broad-crested weir construction. Water from pipe 2500 flows into a container 2310 at a rate for example of 0.0042 cubic meters per second, and exits at a sloped weir 2312 with an edge 2313 that can sit on membrane or sheet 2222. At 10 meters width, the water with colloids exits at approximately an even height of 4 mm. The height flowing over weir 2312 can be altered by altering the flow rate according to the formula, $Q=CLH^{3/2}$, where C is the discharge coefficient 1.704 $m^{1/2}/s$. As with the filtration device 2200, each of the legs of the inlet manifold 2310 may have individual motors controllable by a controller to alter the slope and/or skew of the inlet manifold 2310, for example to ensure an even height flow over the weir. The container preferably is large enough to ensure no ripple or other effects from the pipe and may be for example preferably at least 1 cubic meter and more preferably 10 cubic meters in size, and may also aid in settling non-colloidal particles in the water.

Depending on the type of gas used and other variables such as the colloidal particles present, the diffusiophoretic velocity of the colloidal particles toward the membrane (for positive particles) will vary. However, a velocity of 5 micrometers per second is possible for many if not most particles sought to be removed. It should be noted that negatively charged particles will move away from the membrane and may be skimmed off the top, although such a procedure is only necessary if removal of such particles is desired. Moreover, removal solely of negatively charged particles is also possible.

For a given thickness of 4 mm and a velocity of 5 micrometers per second, to move even the topmost colloidal particles at the inlet to the membrane at the outlet, a dwell time of 800 seconds can be used. Given a flow rate of 0.105 m/s, a flow channel of 84 meters long is provided. With a slope of 0.0025 m/m, the water with colloids thus can begin at a height of 0.21 meters at the inlet above the outlet. The present preferred embodiment thus requires rather precise engineering to slope the membrane to drop 21 centimeters over 84 meters. However with laser aided grading and positioning, and the use of for example a steel support structure with controllable positioning motor on each leg at the four corners for example, the required slope can be rather easily accomplished, and can be little impacted by temperature or other changes.

The actual diffusiophoretic velocity of the colloidal particles can vary, and should particles sought to be removed move more slowly, the suspension thickness can be decreased to increase the gas gradient, or the device lengthened for example, or the output splitting adjusted to remove less filtered water. The width can be increased to increase throughput.

A pressurized gas chamber 2220 receives a pressurized gas, such as carbon dioxide, from for example an industrial source. Gas chamber 2220 has gas tight walls 2226, over which sheet 2222 can be stretched taut and fastened to in a gas tight manner, for example with fasteners and a sealant. The pressurized gas thus can exit in a uniform manner through the sheet 2222. Sheet 2222 thus defines the top of gas chamber 2220 and the bottom of flow chamber 2212.

The colloidal suspension flows from inlet 2210 through flow chamber 2212, which can have water tight walls (2221, FIG. 19) extending from and sealed with respect to sheet 2222. The colloidal suspension thus flows between inlet 2210 and two outlets 2230, 2240 in a flow direction, the sheet 2222 capable of being sloped as described above.

CO2 gas permeates the sheet or membrane 2220 in a direction normal to the sheet or membrane 2220 so as to induce diffusiophoretic motion on positively charged colloidal particles opposite to the direction normal to the membrane, here toward the sheet 2220. Negatively charged colloids can move away from the sheet 2220, and possibly be filtered, split or suctioned from the top of the suspension. The removal of both negatively and positively charged colloids is optional and not necessary in the single splitter embodiment, which can filter one of either the negative or positive charged particles.

Outlet 2240 thus has water having a higher concentration of positively charged colloidal particles, defined as waste water although it can be re-used or refiltered, than a second outlet 2230, which can be defined as having filtered water. Alternately, if seeking to remove negatively charged particles, outlet 2230 can have a larger concentration of negatively charged particles and outlet 2240 can be defined as being filtered water. Two devices can also be used in series to remove both positive and negatively charged particles.

A splitter 2250, extending widthwise in a wing-shaped manner with a trailing edge of the wing facing the stream, is moveable upwardly or downwardly in this embodiment, and can alter the dimensions of the outlet 2240, and thus outlet 2230. This adjustment can be a function of the water quality of the filtered water for example, and provides highly advantageous control of water quality, for example as the sources to be filtered are impacted, for example by rainwater.

The splitter 2250 may be keyed for example for rotation about a shaft, the shaft at one end having a worm gear movable for example by a worm driven by a motor and controller. Very fine distance gradations thus can be achieved. In the example show, the splitter can be located at 1 mm above the sheet 2222 and a bottom of the outlet 2240, so that 3 mm of the 4 mm thick stream passes above the splitter. The distance however can be adjusted as a function of the colloid distribution in the thickness direction in the stream. The splitter 2250 can be for example made of steel with a tip machined to be less than 20 micrometers in thickness at the tip, but can become wider to provide sufficient strength on the width direction.

The flow rate, flow speed and other variables such as size can be selected to minimize mixing, which can aid colloidal particle movement. The cross section of flow chamber 2212 in the widthwise direction preferably is at least 1 m in the widthwise direction, and has a height of at least 1 mm, and forms a rectangular shape. A mixing reducer, such as fins extending in the flow direction to prevent widthwise movement, can be placed directly on sheet 2222. This can also aid in reducing bulging on the sheet 2222 from the gas pressure.

FIG. 19 shows schematically an alternate removable outlet device 2400. A splitter 2420 may be connected to outlet walls 2410 on a support 2430. Splitter 2420 protrudes to fit between walls 2221 of the flow channel at a height OH above membrane 2222. Walls 2410 are liquid tight with walls 2221 and water closer to membrane 2222 can exit out of outlet 2440 and water further away from membrane 2222 at outlet 2450. An alternate removable outlet device with a different height OH then can be used in place of device 2400 to alter the splitter height, for example for different type of colloidal suspension to be filtered.

The present device of the third embodiment allows for a simply-constructed, large flow rate water filtration device that can be generally free of fouling and easy to clean and maintain, all with a low energy consumption. The open channel nature of the present invention permits for large scale water filtration devices that dispense with the need for microchannels or second membranes for closed flow. While the use of open-channel flow for diffusiophoretic water filtration has certain disadvantages over closed-channel constructions in terms of creating and maintaining laminar flows, it is believed that open-channel flows and devices provide an important advancement in the field of diffusiophoretic water filtration and provide for less energy, easier cleaning and better flow rates, especially for large scale structures with flow lengths of 10 meters or more.

What is claimed is:

1. A water filtration device comprising:

a diffusiophoretic water filter having a plurality of side-by-side channels and having an inlet and an outlet and for receiving a colloidal suspension at the inlet and flowing the colloidal suspension between the inlet and the outlet in a flow direction through the plurality of side-by-side channels, the plurality of side-by-side channels being in contact with a diffusiophoretic-inducing membrane on a first side and a gas-permeable cover on a second side facing the first side, the membrane and the cover being spaced apart by two end walls and a plurality of side walls between the two end walls, the side and end walls extending in the flow direction and having a height defining a thickness of the channels; and a weight contacting the cover and pressing the cover against the plurality of side walls between the two end walls so as to fix the cover with respect to the membrane at the plurality of side walls, the weight being gas-permeable so as to allow gas to pass from the channels through the cover and the weight.

2. The water filtration device as recited in claim 1 further comprising: a pressurizable gas chamber for providing pressurized gas to the plurality of channels via the membrane, the membrane being a gas permeable and water impermeable membrane.

3. The water filtration device as recited in claim 1 further comprising an inlet manifold for receiving the colloidal suspension including colloidal particles in water, the inlet manifold including a water pressure regulator, the water pressure regulator having a height regulator regulating a height of the colloidal suspension.

4. The water filtration device as recited in claim 1 further comprising an outlet splitter for connecting to the outlet, the outlet splitter having a first splitter outlet and a second splitter outlet, the first splitter outlet for receiving water having a higher concentration of some of the colloidal particles than a second splitter outlet, the outlet splitter splitting the plurality of side-by-side channels.

5. The water filtration device as recited in claim 4 wherein the outlet splitter is removable.

6. The water filtration device as recited in claim 4 wherein the outlet splitter has a movable splitter device for altering size of the first splitter outlet.

7. The water filtration device as recited in claim 4 wherein the outlet splitter is replaceable by different sized outlet splitters.

8. The water filtration device as recited in claim 1 wherein the cover is removable and reassemblable with respect to the membrane.

9. The water filtration device as recited in claim 1 wherein the membrane has first and second flat planar surfaces on opposing sides, the first planar surface contacting the colloidal suspension.

10. The water filtration device as recited in claim 1 wherein the cover is structured so that the end walls and side walls are integral with the cover.

11. The water filtration device as recited in claim 1 further comprising a removable channel structure having the end and side walls and placed between the membrane and the cover.

12. The water filtration device as recited in claim 1 wherein the membrane is at least 5 cm in width.

13. The water filtration device as recited in claim 1 wherein the membrane is at least 50 cm in length.

14. The water filtration device as recited in claim 1 wherein the membrane is horizontal.

15. The water filtration device as recited in claim 1 wherein the membrane is a PDMS sheet consisting essentially of PDMS having a Shore A of between 40 and 60, a tensile elongation of at least 1000 psi, an elongation to failure at least 200 and a tear B being at least 150 ppi.

16. The water filtration device as recited in claim 1 wherein the membrane is a sheet stretched taut at least in a width direction.

17. The water filtration device as recited in claim 1 further comprising a separate channel structure removable from the membrane and a cover and having the end walls and the side walls.

18. The water filtration device as recited in claim 1 further comprising at least one longitudinally extending clamp fixing the membrane with respect to the cover at one of the two end walls.

* * * * *